US010524585B2

(12) United States Patent
Taylor et al.

(10) Patent No.: US 10,524,585 B2
(45) Date of Patent: Jan. 7, 2020

(54) INFANT CARRIER

(71) Applicant: WONDERLAND SWITZERLAND AG, Steinhausen (CH)

(72) Inventors: Andrew J. Taylor, Mohnton, PA (US); Kyle S. Mason, Lititz, PA (US); Gregory S. Sellers, Christiana, PA (US); Curtis M. Hartenstine, Birdsboro, PA (US); Patrick J. G. Bowers, Hockessin, DE (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 16/383,476

(22) Filed: Apr. 12, 2019

(65) Prior Publication Data
US 2019/0231090 A1    Aug. 1, 2019

Related U.S. Application Data

(62) Division of application No. 15/254,097, filed on Sep. 1, 2016, now Pat. No. 10,299,609.
(Continued)

(51) Int. Cl.
*A47C 4/52* (2006.01)
*A47D 13/02* (2006.01)
(Continued)

(52) U.S. Cl.
CPC .......... *A47D 13/025* (2013.01); *B60N 2/2821* (2013.01); *B60N 2/2845* (2013.01);
(Continued)

(58) Field of Classification Search
CPC .. B60N 2/2821; B60N 2/2845; B60N 2/2881; B60N 2/2884; B60N 2/2812;
(Continued)

(56) References Cited

U.S. PATENT DOCUMENTS

| 4,634,177 A | ‡ | 1/1987 | Meeker | ............... A47D 13/025 |
| | | | | 248/501 |
| 5,863,097 A | ‡ | 1/1999 | Harper | ................. A47D 13/02 |
| | | | | 297/18 |

(Continued)

FOREIGN PATENT DOCUMENTS

| CN | 2010086652 U | | 7/2008 |
| CN | 2010086652 U | ‡ | 7/2008 |

(Continued)

OTHER PUBLICATIONS

The Office Action Report from co-pending DE Patent Application No. 10 2016 116 502.6 dated Nov. 24, 2017, with translation into English.‡

(Continued)

*Primary Examiner* — Chi Q Nguyen
(74) *Attorney, Agent, or Firm* — NZ Carr Law Office, PLLC

(57) ABSTRACT

An infant carrier includes a carrying handle having a coupling shell pivotally connected with a coupling portion of a seat body, and a latch assembled in the coupling shell. The carrying handle is adjustable to multiple angular positions, which include a carry position for facilitating transport of the infant carrier with the carrying handle, and a recline position inclined relative to the carry position. The latch can engage with the coupling portion for locking the carrying handle in position, or disengage from the coupling portion for allowing rotation of the carrying handle. A safety mechanism is disposed in an inner cavity between the coupling shell and the coupling portion, and is operable to allow the latch to engage with the coupling portion for forcing the carrying handle to stop in an intermediate safety position during adjustment of the carrying handle from the carry position toward the recline position.

20 Claims, 24 Drawing Sheets

Related U.S. Application Data

(60) Provisional application No. 62/253,658, filed on Nov. 10, 2015, provisional application No. 62/214,013, filed on Sep. 3, 2015.

(51) Int. Cl.
*B60N 2/28* (2006.01)
*B60N 2/90* (2018.01)

(52) U.S. Cl.
CPC ......... *B60N 2/2881* (2013.01); *B60N 2/2884* (2013.01); *B60N 2002/957* (2018.02)

(58) Field of Classification Search
CPC .... B60N 2/2875; B60N 2/265; B60N 2/2872; B60N 2/2887; B60N 2/26; B60N 2/2806; A47D 13/025
USPC ........ 297/183.4, 256.16, 130, 183.1, 230.13, 297/250.1, 183.3, 256.13
See application file for complete search history.

(56) References Cited

U.S. PATENT DOCUMENTS

| | | | | |
|---|---|---|---|---|
| 5,947,556 | A ‡ | 9/1999 | Strojny | B60N 2/2824 297/13 |
| 5,971,476 | A ‡ | 10/1999 | Gibson | A47D 13/02 297/183.4 |
| 6,017,088 | A ‡ | 1/2000 | Stephens | A47D 13/02 292/50 |
| 6,089,653 | A ‡ | 7/2000 | Hotaling | A47D 1/002 297/130 |
| 6,715,828 | B1 ‡ | 4/2004 | Cheng | A47D 13/02 297/183.2 |
| 7,488,034 | B2 ‡ | 2/2009 | Ohren | B60N 2/2821 297/183.6 |
| 7,597,396 | B2 ‡ | 10/2009 | Longenecker | B60N 2/2806 297/253 |
| 7,798,500 | B2 ‡ | 9/2010 | Den Boer | B62B 7/062 280/47.34 |
| 8,714,639 | B2 ‡ | 5/2014 | Heisey | A47D 13/02 297/183.3 |
| 8,998,312 | B2 ‡ | 4/2015 | Sellers | B60N 2/2845 297/183.4 |
| 10,299,609 | B2 * | 5/2019 | Taylor | A47D 13/025 |
| 2005/0110318 | A1 ‡ | 5/2005 | Meeker | B60N 2/2812 297/25 |
| 2011/0298259 | A1 ‡ | 12/2011 | Heisey | B60N 2/2821 297/256.16 |
| 2012/0104808 | A1 ‡ | 5/2012 | Sellers | B60N 2/2845 297/183.4 |
| 2015/0250330 | A1 ‡ | 9/2015 | Mountz | A47D 13/105 297/183.4 |

FOREIGN PATENT DOCUMENTS

| | | | | |
|---|---|---|---|---|
| CN | 102463912 | A | 5/2012 | |
| CN | 102463912 | A ‡ | 5/2012 | .......... B60N 2/2845 |
| CN | 203611799 | U | 5/2014 | |
| CN | 203611799 | U ‡ | 5/2014 | |
| DE | 102011116989 | A1 ‡ | 5/2012 | .......... B60N 2/2845 |
| DE | 102011116989 | A1 | 5/2012 | |
| EP | 1839937 | A1 | 3/2007 | |
| EP | 1839937 | A1 ‡ | 3/2007 | ............. A47D 13/02 |
| EP | 1839937 | A1 ‡ | 10/2007 | ............. A47D 13/02 |
| EP | 1839937 | A1 | 10/2007 | |
| EP | 1847438 | A2 ‡ | 10/2007 | ............. A47D 13/02 |
| EP | 1847438 | A2 | 10/2007 | |
| EP | 1732782 | B1 | 9/2013 | |
| EP | 1732782 | B1 ‡ | 9/2013 | .......... B60N 2/2812 |
| GB | 2432345 | A ‡ | 5/2007 | .......... B60N 2/2845 |
| GB | 2432345 | A | 5/2007 | |
| GB | 2495229 | A ‡ | 4/2013 | .......... B60N 2/2845 |
| GB | 2495229 | A | 4/2013 | |
| WO | 2010015003 | A1 | 2/2010 | |
| WO | WO-2010015003 | A1 ‡ | 2/2010 | ............... B62B 7/08 |

OTHER PUBLICATIONS

The Office Action in co-pending British Application No. 1614896.7 dated Jan. 31, 2017.‡
Office Action dated Jun. 20, 2018 in co-pending Chinese Patent Application No. 201610803584.5.‡
The Office Action from co-pending DE Patent Application No. 10 2016 116 502.6 dated Nov. 24, 2017, with translation in English.
The Office Action in co-pending British Application No. 1514896.7 dated Jan. 31, 2017.

* cited by examiner
‡ imported from a related application

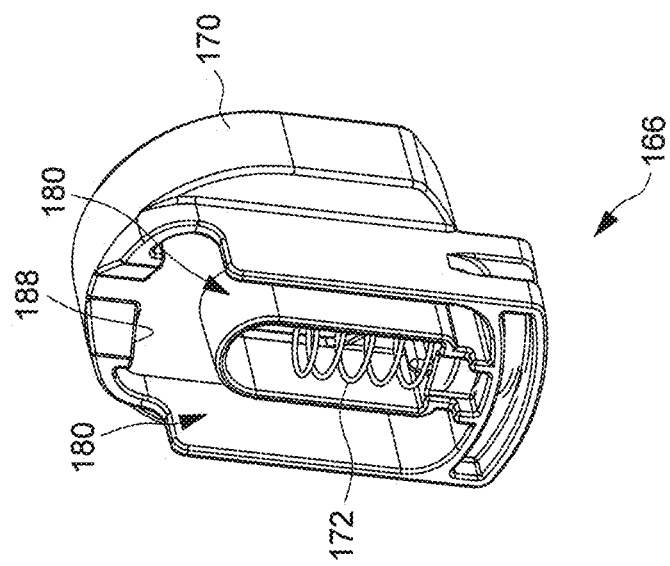
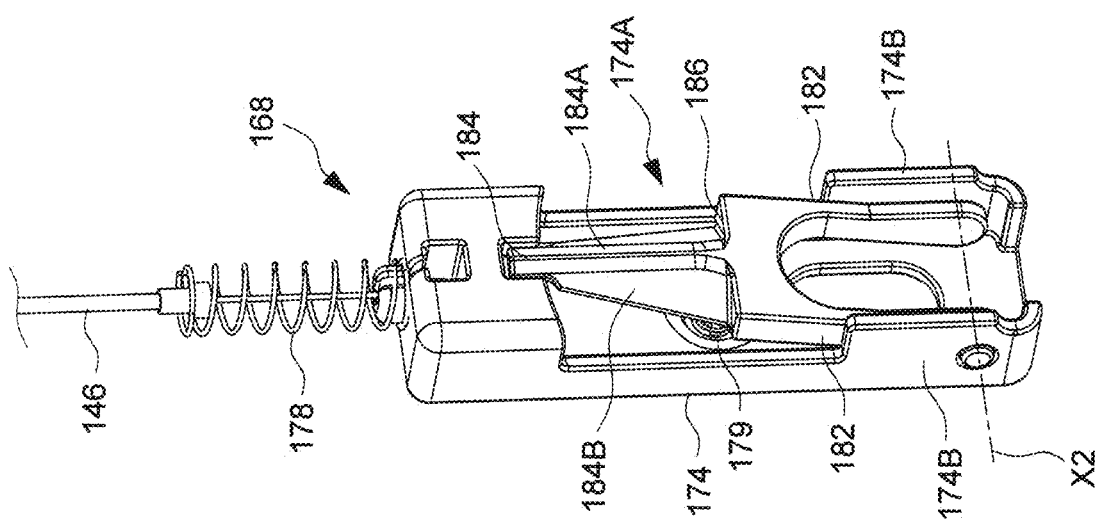
FIG. 19

INFANT CARRIER

CROSS-REFERENCE TO RELATED APPLICATION(S)

This application is a divisional application of U.S. non-provisional application Ser. No. 15/254,097 filed on Sep. 1, 2016, now U.S. Pat. No. 10,299,609, which respectively claims priority to U.S. provisional application No. 62/214,013 filed on Sep. 3, 2015, and to U.S. provisional application No. 62/253,658 filed on Nov. 10, 2015, the disclosures of which are incorporated herein by reference.

BACKGROUND

1. Field of the Invention

The present invention relates to infant carriers that can be used as child safety seats.

2. Description of the Related Art

Safety legislations require the use of a child safety seat for seating a young child in a motor vehicle. The child safety seat may include an infant carrier supported on a bottom base, and can be fastened on the vehicle seat with a seatbelt of the vehicle or a separate strap secured or provided with the child safety seat. Moreover, the infant carrier may be detached from the bottom base, and transported with a carrying handle that is pivotally connected on the infant carrier. With respect to those products having a carrying handle, there may be a need for an improved design that can provide a safer use of the carrying handle.

SUMMARY

The present application describes an infant carrier having a carrying handle. According to some embodiment, the infant carrier includes a seat body for receiving a child and having a coupling portion at one side, a carrying handle having a coupling shell pivotally connected with the coupling portion, a latch assembled in the coupling shell, a latch biasing spring connected with the latch, a release member assembled with the carrying handle and operatively connected with a cable, a carriage anchored with one end of the cable and disposed adjacent to the latch, and a catching part connected with the carriage. The carrying handle is adjustable to a plurality of angular positions to relative to the seat body, the angular positions including a first angular position and a second angular position. The latch is movable relative to the coupling shell to engage with the coupling portion for blocking rotation of the carrying handle or to disengage from the coupling portion for allowing rotation of the carrying handle, the latch biasing spring urging the latch for engagement with the coupling portion. The catching part is movable relative to the carriage between a first and a second state, the carriage and the catching part in the first state being movable in unison upon actuation of the release member so that the catching part engages with the latch and urges the latch to disengage from the coupling portion, and the catching part when in the second state being disengaged from the latch so that the latch is movable relative to the carriage and the catching part for engagement with the coupling portion. A rotation of the carrying handle from the first angular position toward the second angular position causes the coupling portion to push the catching part so that the catching part switches from the first state to the second state for disengaging from the latch, thereby the latch moves to engage with the coupling portion for forcing the carrying handle to stop in an intermediate safety position between the first and second angular positions.

According to other embodiments, the infant carrier includes a seat body for receiving a child, a carrying handle, a latch, a latch biasing spring, a release member, a carriage and a catching part. A side of the seat body has a coupling portion, and the carrying handle has a coupling shell pivotally connected with the coupling portion of the seat body, the carrying handle being adjustable to a plurality of angular positions relative to the seat body, the angular positions including a first angular position and a second angular position. The latch is assembled in the coupling shell of the carrying handle, the latch being movable relative to the coupling shell to engage with the coupling portion for blocking rotation of the carrying handle or to disengage from the coupling portion for rotation of the carrying handle. The latch biasing spring is connected with the latch, and can urge the latch for engagement with the coupling portion. The release member is assembled with the carrying handle and is operatively connected with a cable. The carriage is connected with the catching part and is anchored with one end of the cable, wherein the carriage has a first and a second position relative to the latch, the carriage being coupled with the latch via engagement of the catching part in the first position, and the carriage being decoupled from the latch in the second position. A rotation of the carrying handle from the first angular position toward the second angular position with the carriage in the first position causes the coupling portion to push against the catching part so that the catching part disengages from the latch for decoupling the carriage from the latch, thereby the latch moves relative to the carriage to engage with the coupling portion for forcing the carrying handle to stop in an intermediate safety position between the first and second angular positions.

BRIEF DESCRIPTION OF THE DRAWINGS

FIGS. 18 and 19 are schematic views illustrating another embodiment of a latching mechanism and a safety mechanism for preventing inadvertent rotation of the carrying handle from the carry position to the recline position.

DETAILED DESCRIPTION OF THE EMBODIMENTS

Figure 1:
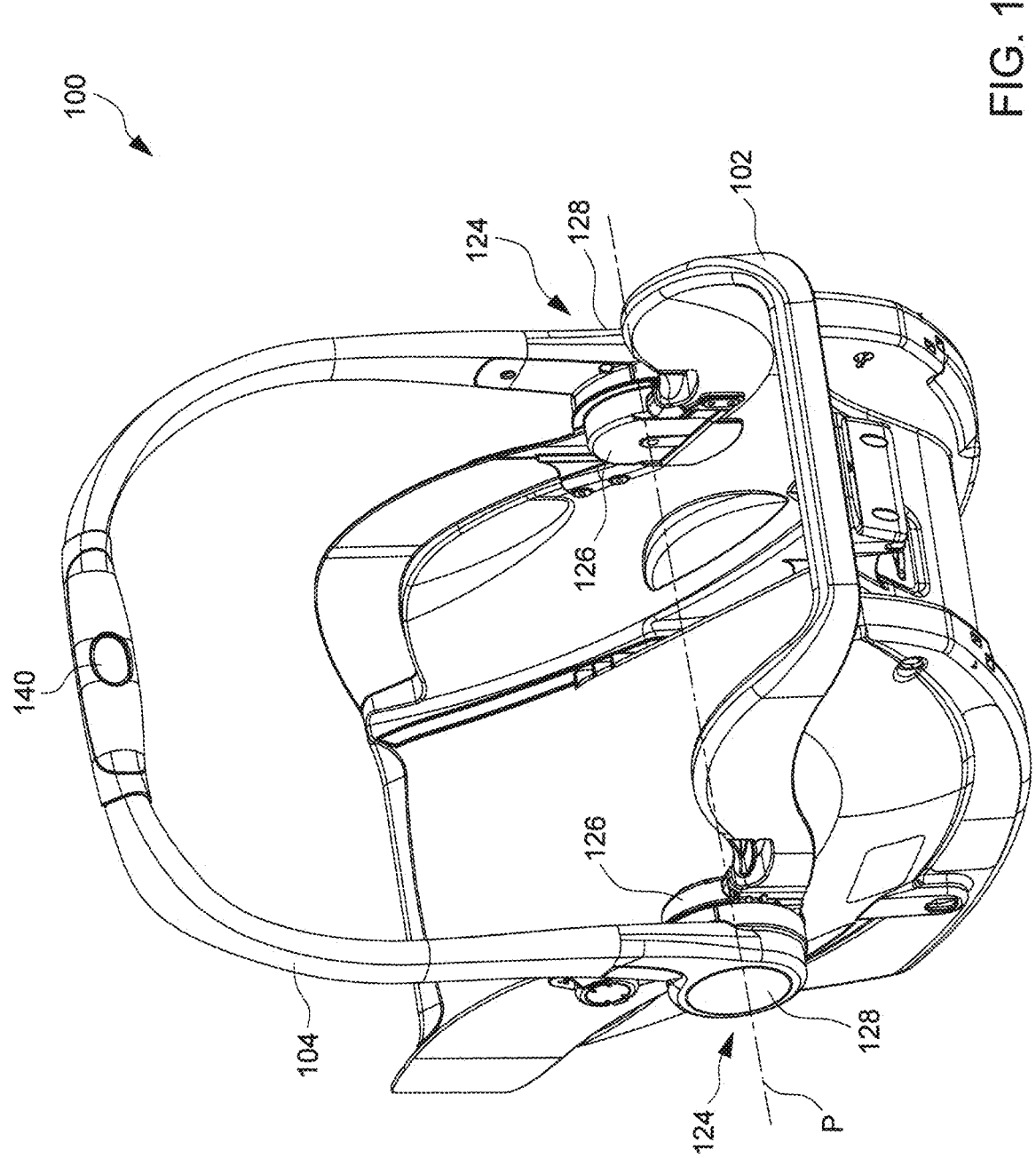
FIG. 1 is a schematic view illustrating an embodiment of an infant carrier.
Figure 2:
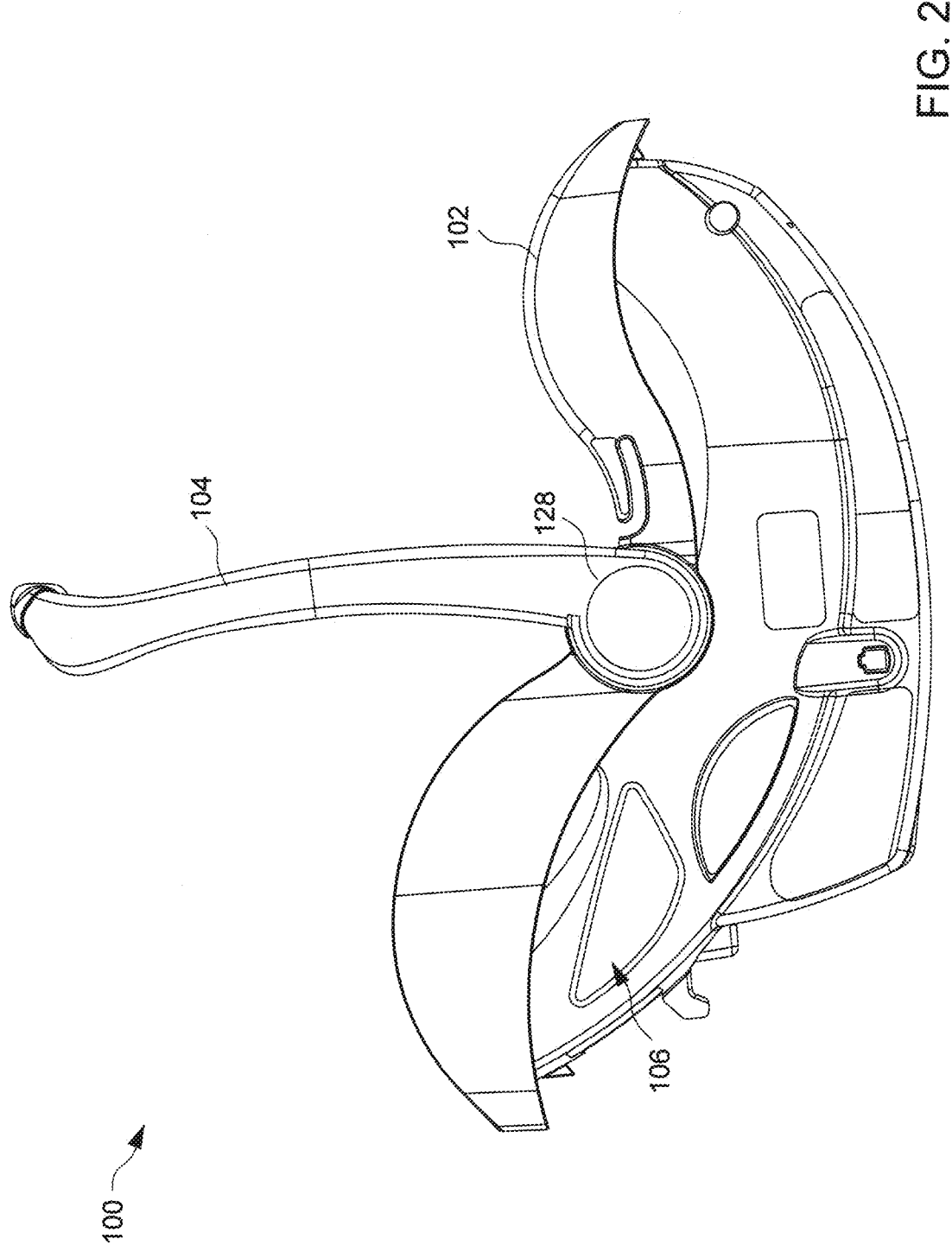
FIG. 2 is a side view of the infant carrier with a carrying handle in a carry position.

FIG. 1 is a perspective view illustrating an embodiment of an infant carrier 100, and FIG. 2 is a side view of the infant carrier 100. Referring to FIGS. 1 and 2, the infant carrier 100 includes a seat body 102, and a carrying handle 104 pivotally connected with the seat body 102. The seat body 102 can be made of rigid plastics, and defines an inner space for receiving a child. In use, the infant carrier 100 may be mounted on a support base (not shown) for installation on a vehicle seat as a child safety seat, or may be detached from the support base for transporting a child sitting in the infant carrier 100. Moreover, a curved bottom of the seat body 102 can allow rocking of the infant carrier 100 for soothing or entertaining a child when the infant carrier 100 is placed on a fixed support surface such as a floor or table surface.

Figure 3:
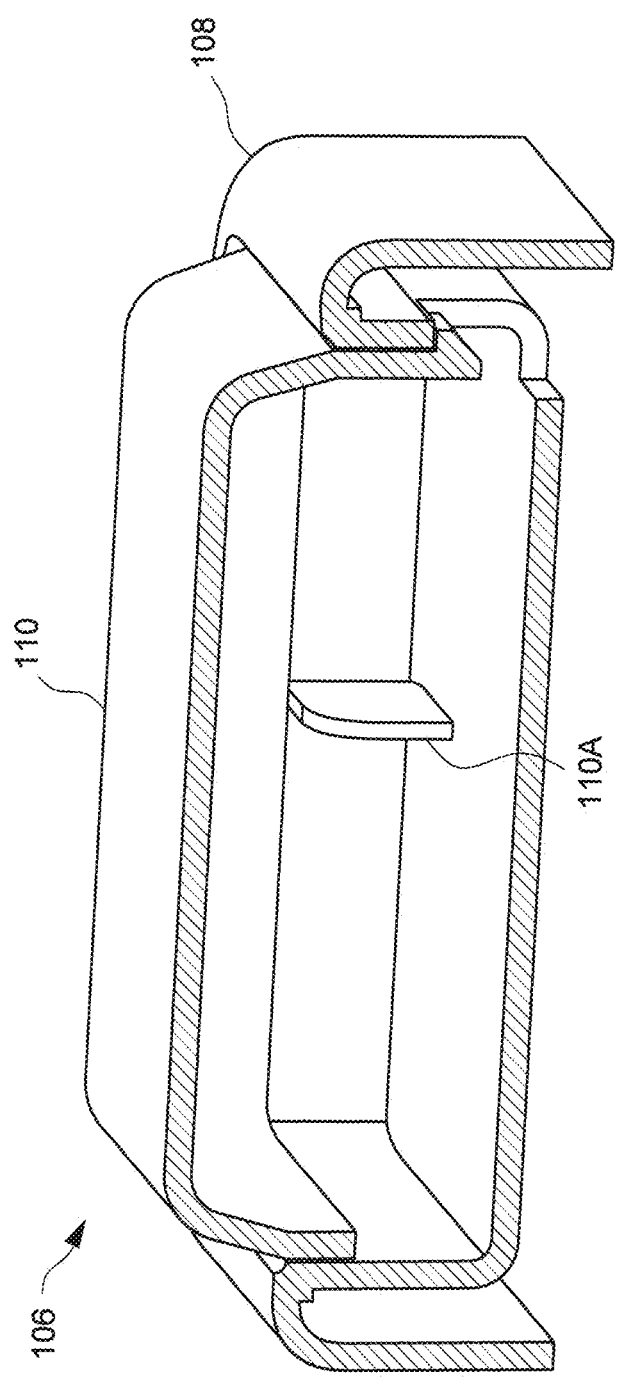
FIG. 3 is a schematic view illustrating a construction of a shock-absorbing cushion provided on an outer side surface of the infant carrier.

Referring to FIG. 2, the infant carrier 100 can further include one or two shock-absorbing cushion 106 respectively attached to one or two outer side surface of the seat body 102. The shock-absorbing cushion 106 can be placed near a headrest region of the seat body 102, and can dissipate at least partially the energy induced by an impact on the side of the infant carrier 100, such as collision of the infant carrier 100 with a vehicle door. FIG. 3 is a schematic view illustrating exemplary construction of the shock-absorbing cushion 106. The shock-absorbing cushion 106 can include a mount socket 108 fixedly secured with the seat body 102, and a panel 110 attached to the mount socket 108 and exposed outward. The interior of the mount socket 108 can be to affixed with one or more ribs 110A disposed near an edge of the panel 110. When it is hit by an impact, the panel 110 can move relative to the mount socket 108 to crush the rib 110A, thereby dissipating the impact energy.

Figure 4:
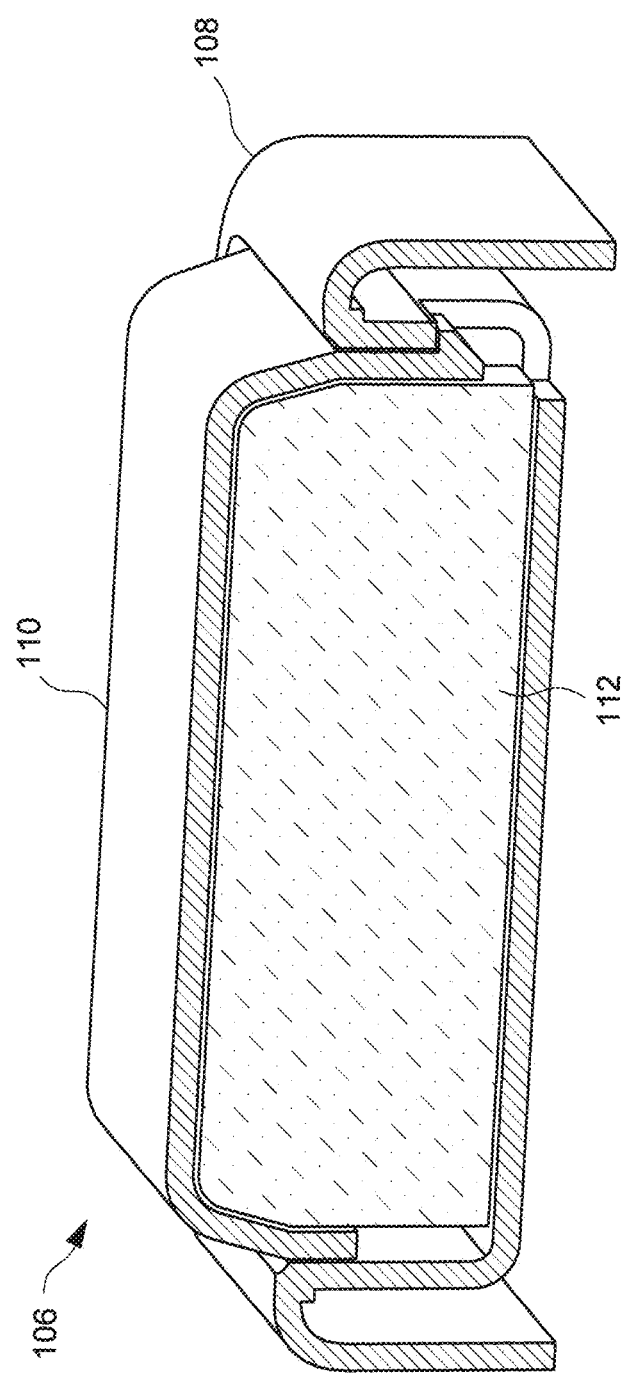
FIG. 4 is a schematic view illustrating a variant construction of the shock-absorbing cushion provided on the outer side surface of the infant carrier.

FIG. 4 is a schematic view illustrating a variant construction of the shock-absorbing cushion 106 in which an energy-absorbing material 112 may be placed between the mount socket 108 and the panel 110. Examples of the energy-absorbing material 112 can include, without limitation, expanded polystyrene, expanded polypropylene, and the like. When it is hit by an impact, the panel 110 can move relative to the mount socket 108 to press and cause deformation of the energy-absorbing material 112, which can thereby dissipate the impact energy.

Referring again to FIGS. 1 and 2, the carrying handle 104 can have an arc shape with two opposite ends respectively connected pivotally with a left and a right side of the seat body 102. The carrying handle 104 may be adjustable to a plurality of angular positions relative to the seat body 102 according to the caregiver's needs. FIGS. 1, 2, 5 and 6 are schematic views illustrating the infant carrier 100 with the carrying handle 104 set to various angular positions.

In FIGS. 1 and 2, the carrying handle 104 is shown in an angular position where it erects generally vertical above the seat body 102 for facilitating transport of the infant carrier 100 with the carrying handle 104. A caregiver can grasp the carrying handle 104 in the carry position shown in FIGS. 1 and 2 for lifting and transporting the infant carrier 100.

Figure 5:
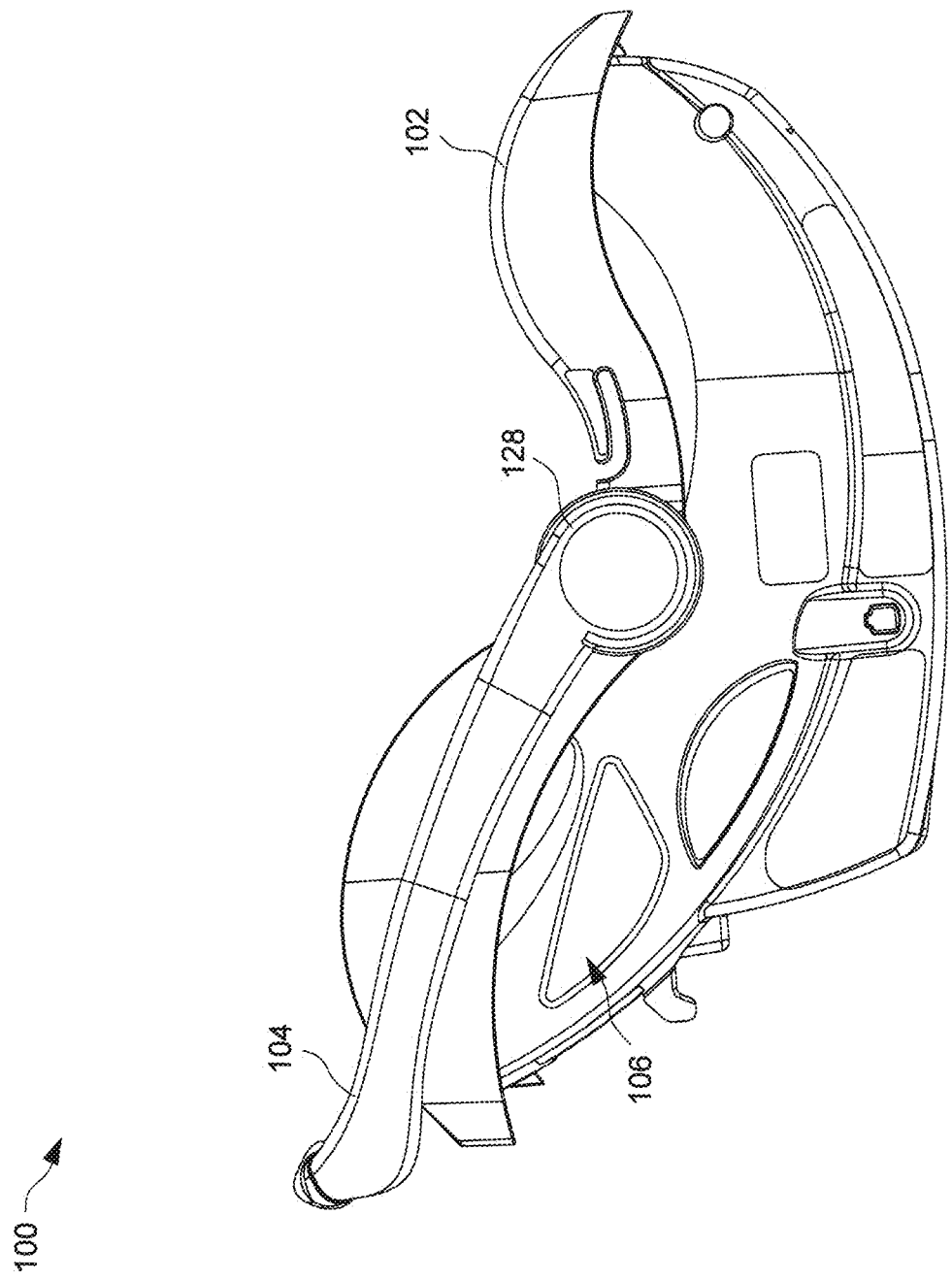
FIG. 5 is a schematic view illustrating the infant carrier with a carrying handle in a recline position.

In FIG. 5, the carrying handle 104 is shown in another angular position where it is inclined rearward relative to the carry position shown in FIG. 2. When it is in the recline position shown in FIG. 5, the carrying handle 104 can extend generally along the contour of a rear or back portion of the seat body 102, and barely protrudes above the seat body 102. The carrying handle 104 may be adjusted to the recline position shown in FIG. 5 when the infant carrier 100 is installed on a vehicle seat for use as a child safety seat.

Figure 6:
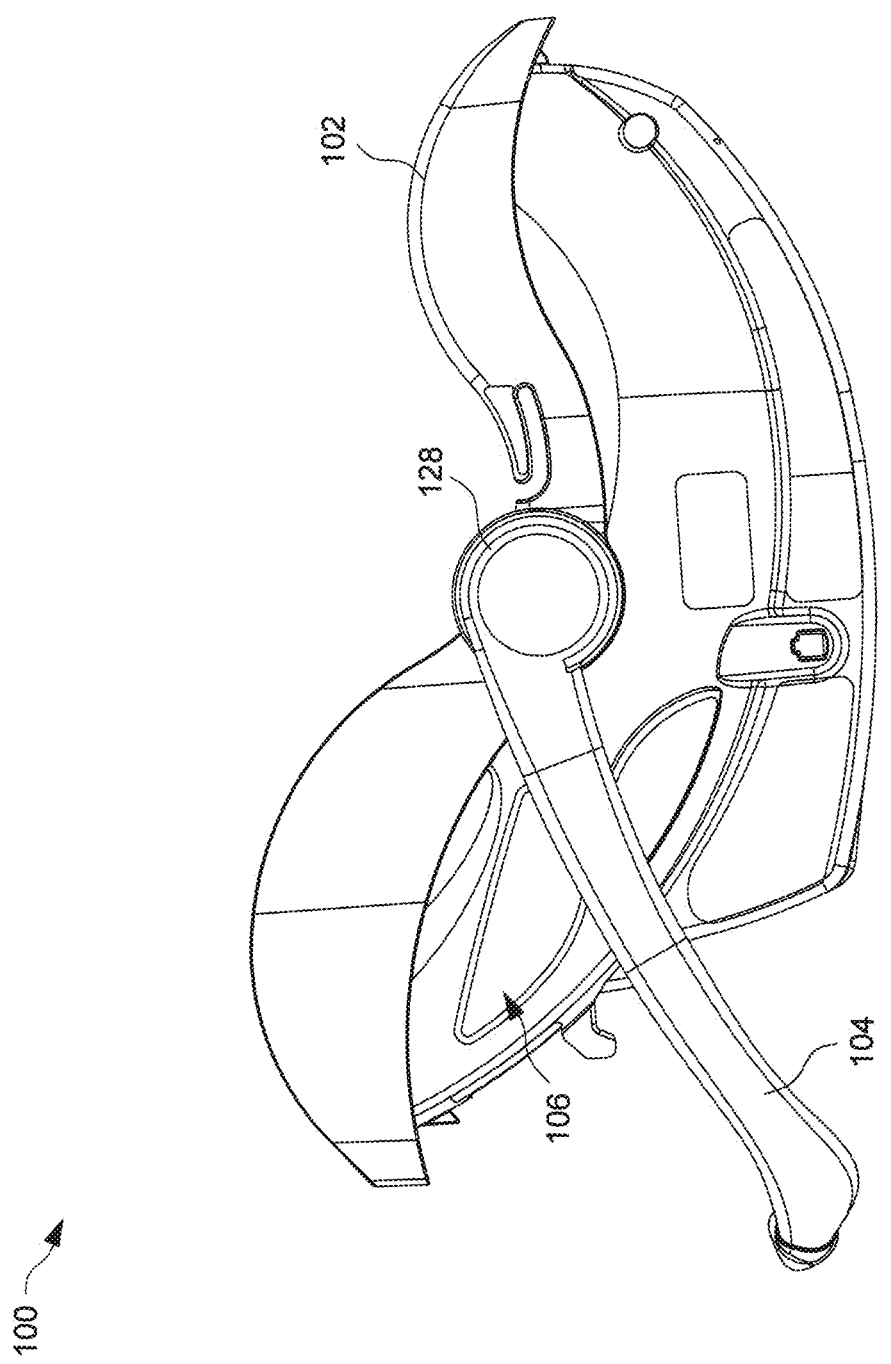
FIG. 6 is a schematic view illustrating infant carrier with the carrying handle in another angular position.

In FIG. 6, the carrying handle 104 is shown in another angular position where it is inclined rearward and downward. When the infant carrier 100 rests on a fixed support surface such as a floor or table surface, the carrying handle 104 can be placed in the angular position of FIG. 6 so as to abut against the fixed support surface to prevent rocking of the infant carrier 100.

Figure 7:
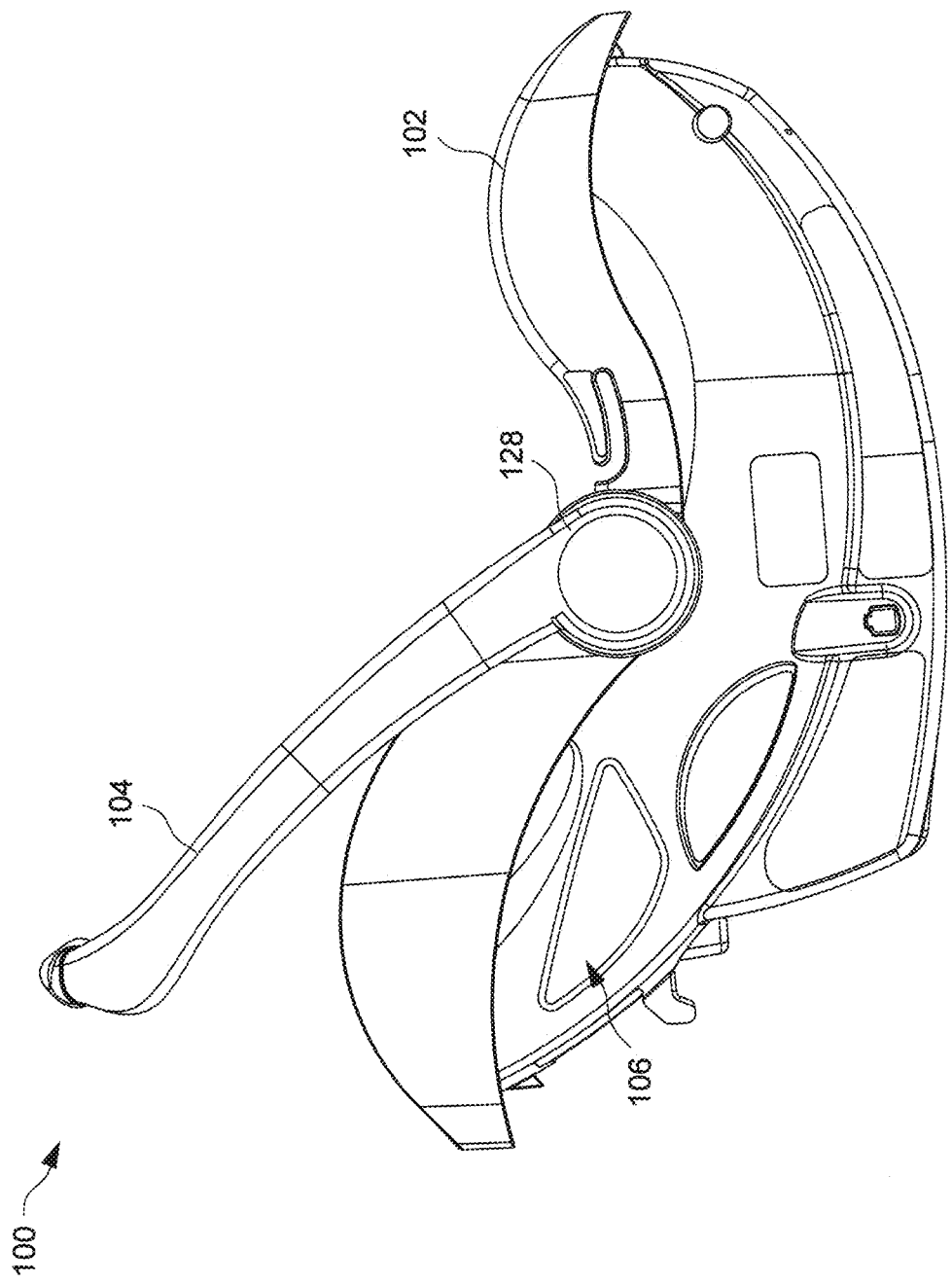
FIG. 7 is a schematic view illustrating infant carrier with the carrying handle stopped in a safety position between the carry position shown in FIG. 2 and the recline position shown in FIG. 5.

While the carrying handle 104 can be desirably adjusted to the different angular positions in accordance with the caregiver's needs, inadvertent rotation of the carrying handle 104 (e.g., caused by accidental actuation of a release member of the carrying handle 104) may induce some risk of accidents. For example, the recline position of the carrying handle 104 shown in FIG. 5 extends behind the seat body 102, and may induce undesirable rotation of the infant carrier 100 to a position in which the occupant could fall out of the infant carrier 100. In addition to a latching mechanism 120 (better shown in FIGS. 8 and 9) for locking the carrying handle 104 in the different angular positions, the infant carrier 100 further includes a safety mechanism 122 (better shown in FIGS. 8 and 9) that can force the carrying handle 104 to stop in an intermediate safety position between two predetermined angular positions. FIG. 7 is a schematic view illustrating one embodiment of the infant carrier 100 with the carrying handle 104 stopped in a safety position between the carry position shown in FIG. 2 and the recline position shown in FIG. 5. This safety position can prevent accidental rotation of the carrying handle 104 from the carry position of FIG. 2 to the recline position of FIG. 5.

Figure 8:
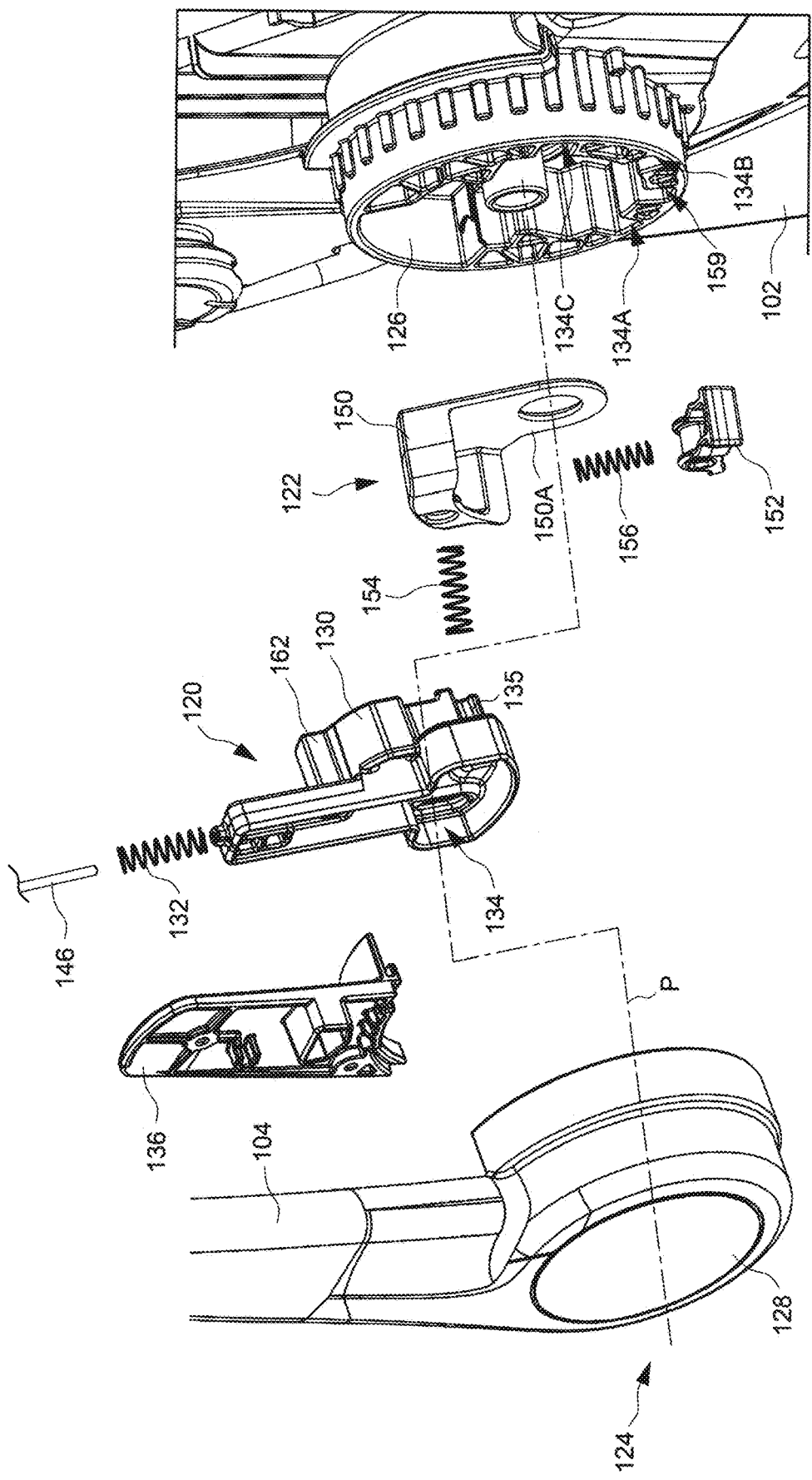
FIGS. 8 and 9 are respectively an exploded and a cross-sectional view illustrating a construction of a latching mechanism and a safety mechanism provided in a pivot joint connecting the carrying handle with a seat body of the infant carrier.

In conjunction with FIGS. 1 and 2, FIGS. 8 and 9 are respectively an exploded and a cross-sectional view illustrating the construction of the latching mechanism 120 and the safety mechanism 122. The same latching mechanism 120 and safety mechanism 122 can be provided in each of two pivot joints 124 that respectively connect pivotally the carrying handle 104 with the left and right sides of the seat body 102. Referring to FIGS. 1, 2 and 8, each pivot joint 124 can include a coupling portion 126 fixedly connected with a side of the seat body 102, and a coupling shell 128 fixedly connected with the carrying handle 104. The coupling shell 128 is pivotally connected with the coupling portion 126 about a pivot axis P, and the carrying handle 104 is rotatable about the pivot axis P for adjustment between the different angular positions shown in FIGS. 2, 5, 6 and 7. The coupling portion 126 and the coupling shell 128 can define an inner space in which are assembled the latching mechanism 120 and the safety mechanism 122.

Figure 9:
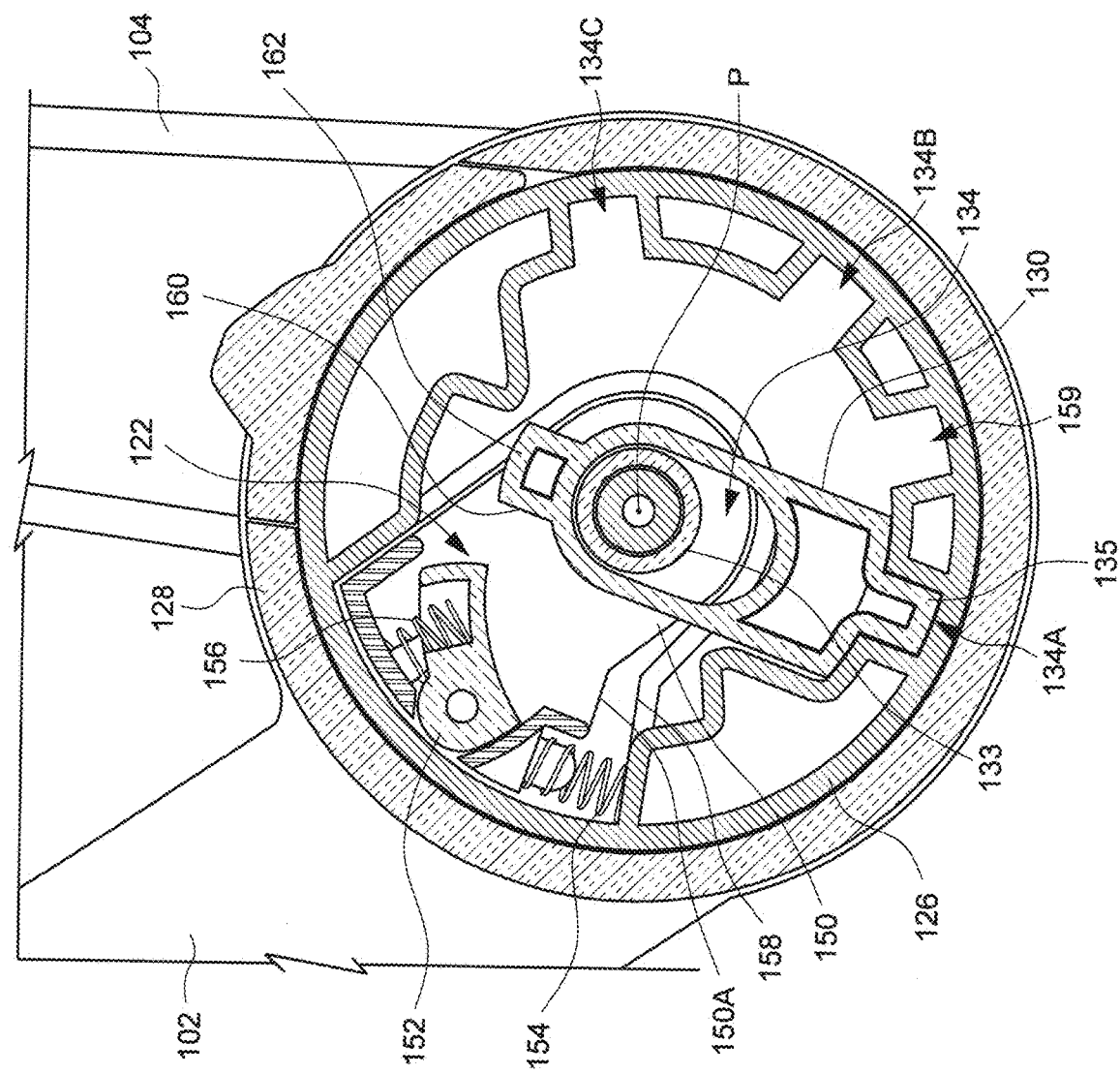

Referring to FIGS. 8 and 9, the latching mechanism 120 includes a latch 130 and a latch biasing spring 132. The latch 130 is assembled in the coupling shell 128 for sliding movement along an axis that is perpendicular to the pivot axis P of the carrying handle 104, For example, the latch 130 can include a guide slot 134, and the coupling shell 128 can have a shaft 133 extending along the pivot axis P that passes through the guide slot 134. The latch 130 can slide relative to the coupling shell 128 and the carrying handle 104 to engage with the coupling portion 126 for blocking rotation of the carrying handle 104 and to disengage from the coupling portion 126 for allowing rotation of the carrying handle 104. The coupling portion 126 can include a plurality of locking grooves 134A, 134B and 134C distributed around the pivot axis P corresponding to the different angular positions of the carrying handle 104, and the latch 130 can engage with any of the locking grooves 134A, 134B and 134C to lock the carrying handle 104 in the corresponding angular position. For example, the latch 130 can engage with the locking groove 134A to lock the carrying handle 104 in the carry position shown in FIG. 2, engage with the locking groove 134B to lock the carrying handle 104 in the recline position shown in FIG. 5, and engage with the locking groove 134C to lock the carrying handle 104 in the angular position shown in FIG. 6. For facilitating the locking engagement of the latch 130 with the coupling portion 126, an end of the latch 130 can be formed with a protrusion 135 that can engage with any of the locking grooves 134A, 134B and 134C. The latch 130 can be retained in the coupling shell 128 by a cap 136 that is fixedly attached to the carrying handle 104.

The latch biasing spring 132 can have two opposite ends respectively connected with the latch 130 and a fixed structure in the carrying handle 104 (e.g., provided on the cap 136). The latch biasing spring 132 can urge the latch 132 for engagement with the coupling portion 126 to lock the carrying handle 104 in position.

In conjunction with FIGS. 1 and 8, FIGS. 10 and 11 are respectively an exploded and a cross-sectional view illustrating a release mechanism 138 that is operatively connected with the two latches 130 in the coupling shells 128 at each of the left and right sides of the carrying handle 104. The release mechanism 138 can include a release member 140, a spring 142, two actuators 144 and two cables 146. The release member 140, the spring 142 and the two actuators 144 can be assembled in a central cavity 104A of the carrying handle 104, which can be covered with a cap 148. The release member 140 can be slidably assembled with the carrying handle 104, and can have two fingers 140A at a left and a right side. The release member 140 can exemplary be a release button operable by a caregiver. When the release member 140 is assembled with the carrying handle 104, the two fingers 140A are disposed inside the carrying handle 104, and a portion of the release member 140 is exposed through an opening 148A of the cap 148 for manual operation. The spring 142 can have two opposite ends respectively connected with the release member 140 and an inner sidewall of the carrying handle 104. The spring 142 can apply a biasing force for urging the release member 140 to protrude outward.

The two actuators 144 can be respectively connected pivotally with the carrying handle 104 at a left and a right side of the release member 140, and can be respectively in sliding contact with the two fingers 140A. The two cables 146 are respectively guided through an interior of the carrying handle 104 at the left and right sides of the release member 140, and respectively extend into the coupling shells 128. The cables 146 can include, without limitation, wires, ropes, strips and the like. Each cable 146 has one end anchored with one actuator 144, and another opposite end anchored with one latch 130.

With the aforementioned assembly, the release member 140 is operatively connected with the two latches 130 in the coupling shells 128 at the left and right sides of the carrying handle 104 via the two cables 146. When it is depressed against the biasing action of the spring 142, the release member 140 can urge the two actuators 144 to rotate for pulling the two cables 146, which in turn can pull the two latches 130 to concurrently slide and disengage from the coupling portions 126. The carrying handle 104 is thereby unlocked, and can be rotated for adjustment to a desired angular position. During rotational movement of the carrying handle 104, the two latches 130 move along with the carrying handle 104, and the release member 140 can be kept in the depressed state. When the caregiver releases the pressing action applied on the release member 140, the spring 142 can urge the release member 140 to protrude outward and recover its initial position.

Referring again to FIGS. 8 and 9, the safety mechanism 122 is disposed in an inner cavity defined at least partially by the coupling portion 126 and the coupling shell 128. During adjustment of the carrying handle 104 from the carry position of FIG. 2 toward the recline position of FIG. 5, the safety mechanism 122 can interact with the latch 130 for forcing the carrying handle 104 to stop in the intermediate safety position of FIG. 7, such that the latch 130 can engage with the coupling portion 126 for locking the carrying handle 104 in the safety position. Referring to FIGS. 8 and 9, the safety mechanism 122 can include a carriage 150, an impeding part 152 and two springs 154 and 156. The carriage 150 and the impeding part 152 are assembled on the coupling portion 126. More specifically, the carriage 150 can be pivotally connected with the coupling portion 126, e.g., about the same pivot axis P of the carrying handle 104. The carriage 150 can rotate relative to the coupling portion 126 between a first position where an edge 150A of the carriage 150 is located away from a fixed stop rib 158 of the coupling portion 126, and a second position where the edge 150A of the carriage 150 contacts with the stop rib 158 of the coupling portion 126.

The spring 154 can have two opposite ends respectively connected with the carriage 150 and the coupling portion 126. The spring 154 can bias the carriage 150 for rotation about the pivot axis P toward the first position for displacing the edge 150A away from the stop rib 158 of the coupling portion 126.

The impeding part 152 is pivotally connected with the carriage 150 at a location apart from the pivot axis P, the pivot axis of the impeding part 152 being generally parallel to the pivot axis P. The impeding part 152 can rotate relative to the coupling portion 126 and the carriage 150 between a first state (better shown in FIG. 9) where the impeding part 152 interferes with a rotational path of the latch 130 about the pivot axis P, and a second state (better shown in FIG. 16) where the impeding part 152 clears off the rotational path of the latch 130.

The spring 156 has two opposite ends respectively connected with the impeding part 152 and the carriage 150. The spring 156 can bias the impeding part 152 toward the first state for interfering with the rotational path of the latch 130 about the pivot axis P.

In addition, the safety mechanism 122 can include a locking groove 159 provided in the coupling portion 126 between the two locking grooves 134A and 134B. The latch 130 can engage with the locking groove 159 for locking the carrying handle 104 in the safety position. Like for the other angular positions, the release member 140 can be depressed to disengage the latch 130 from the locking groove 159 for allowing rotation of the carrying handle 104 away from the safety position.

In conjunction with FIGS. 2 and 5-11, FIGS. 12-17 are schematic views illustrating exemplary operation of the latching mechanism 120 and the safety mechanism 122. In FIG. 9, the latch 130 is shown as being engaged with the locking groove 134A, such that the carrying handle 104 can be locked in the carry position shown in FIG. 2. While the carrying handle 104 is in the carry position, the carriage 150 is in the first position with the edge 150A thereof spaced apart from the stop rib 158 of the coupling portion 126, and the impeding part 152 is in the first state. Moreover, an interacting surface 160 of the latch 130 is located away from the impeding part 152. The interacting surface 160 can be exemplary defined on a protrusion 162 provided on the latch 130 at a side opposite to the protrusion 135.

Suppose that the carrying handle 104 is to be adjusted rearward from the carry position of FIG. 2 to the recline position of FIG. 5. The caregiver can depress the release member 140 (better shown in FIGS. 10 and 11), which causes the latch 130 to disengage from the locking groove 134A as shown in FIG. 12. The carrying handle 104 thereby unlocked then can be rotated rearward.

Figure 13:
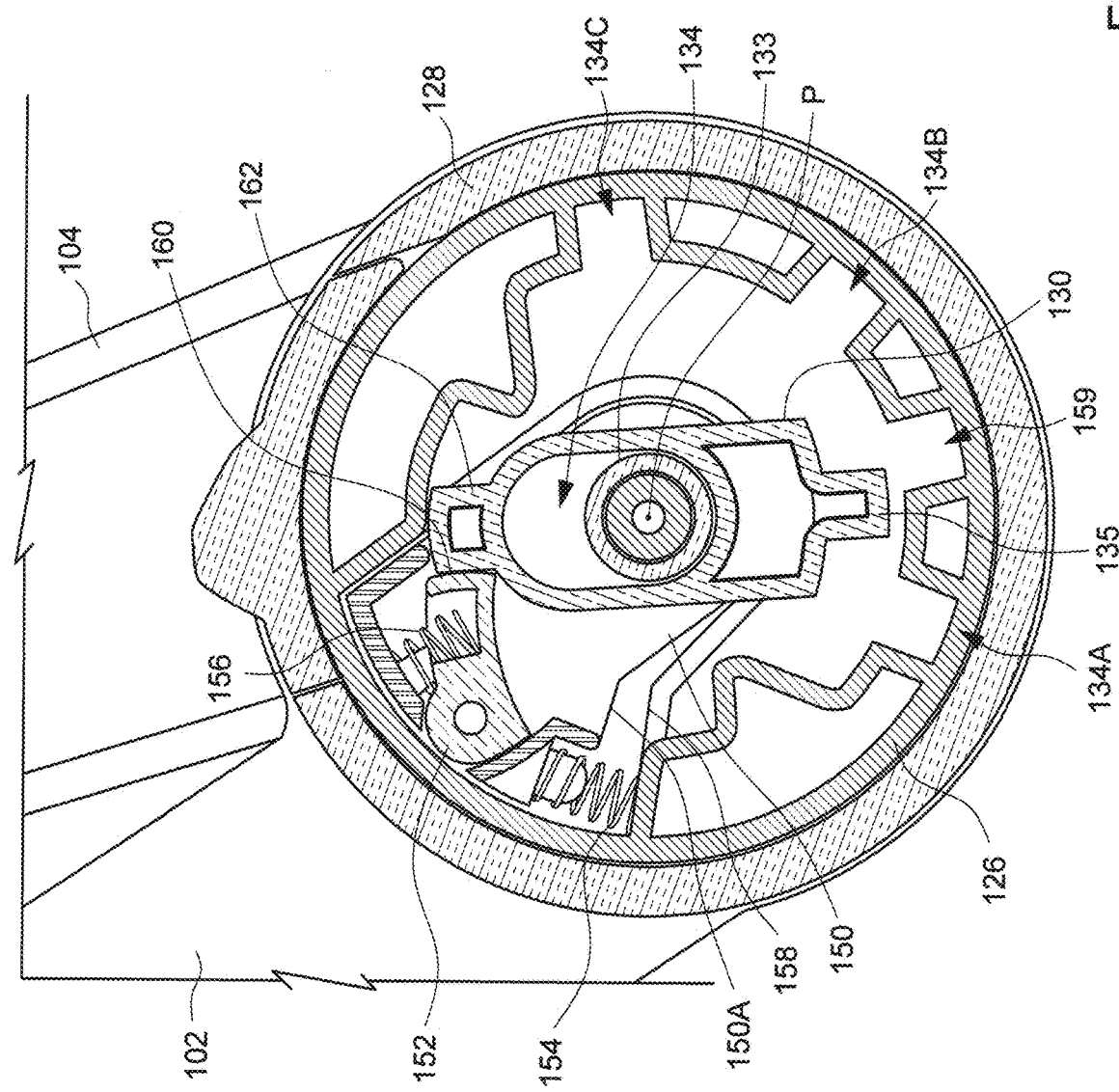
Figure 14:
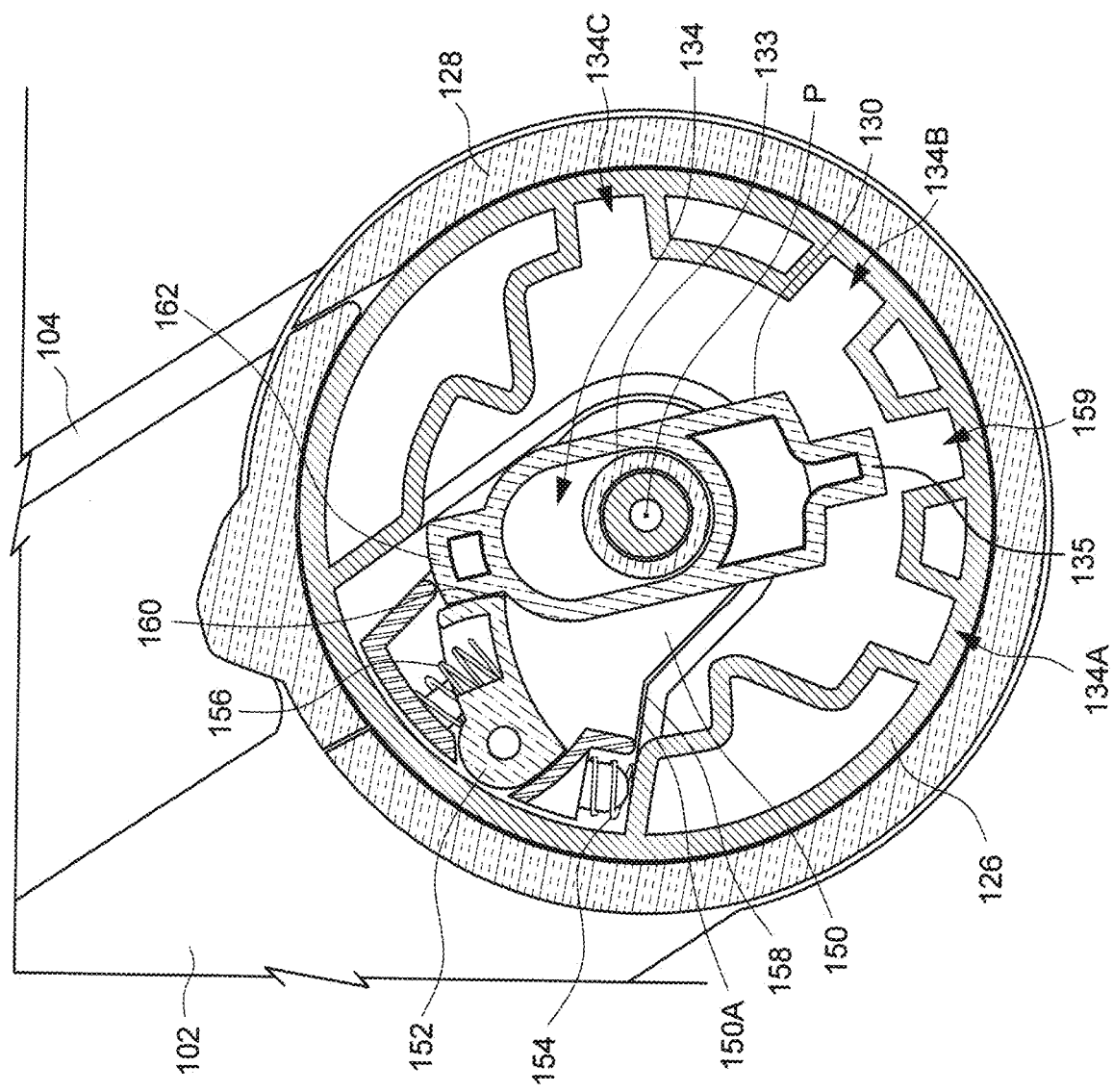

Referring to FIG. 13, as the carrying handle 104 rotates rearward away from the carry position, the interacting surface 160 of the latch 130 can come in contact with the impeding part 152 that is in the first state. Then the latch 130 pushes the impeding part 152 and the carriage 150 to move rearward in unison until the edge 150A of the carriage 150 contacts with the stop rib 158 of the coupling portion 126 as shown in FIG. 14, which thereby stops the carriage 150 in the second position. While the carriage 150 is stopped in the second position, the impeding part 152 remains in the first state, and the contact of the latch 130 with the impeding part 152 can force the carrying handle 104 to stop in the intermediate safety position of FIG. 7, which is located between the carry position of FIG. 2 and the recline position of FIG. 5.

Figure 15:
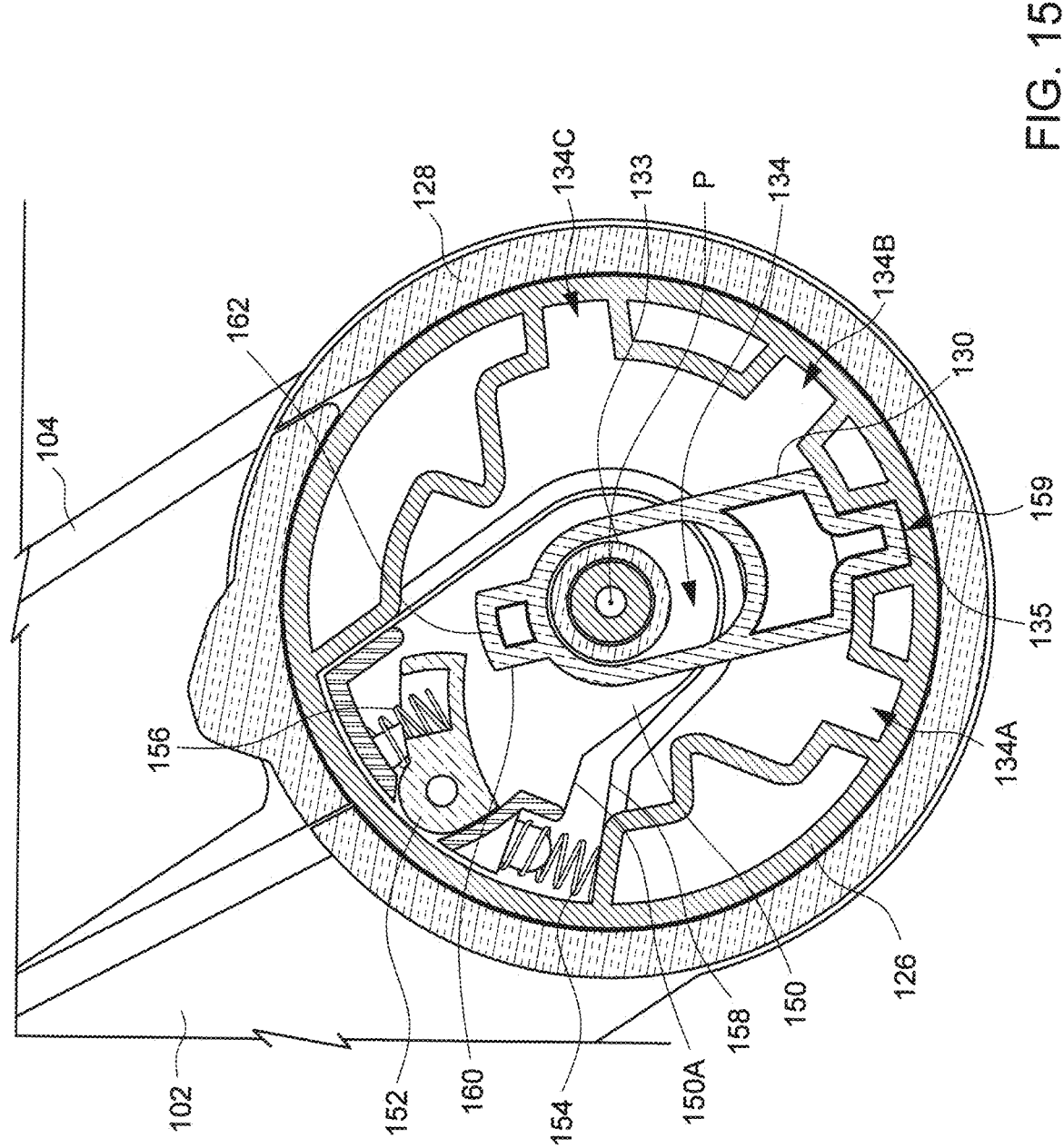

Referring to FIG. 15, while the carrying handle 104 is stopped in the safety position, the caregiver can release the pressing action exerted on the release member 140, so that the latch 130 can move to engage with the locking groove 159 of the coupling portion 126 for locking the carrying handle 104 in the safety position. This locking engagement of the latch 130 can disengage the interacting surface 160 of the latch 130 from the impeding part 152, and allows the carriage 150 to move away from the stop rib 158 and recover the first position under the biasing action exerted by the spring 154. Once the latch 130 is engaged with the locking groove 159, the impeding part 152 still remains in the first state owing to the biasing action of the spring 156, and is located above the protrusion 162 of the latch 130 along a radial direction from the pivot axis P.

Figure 16:
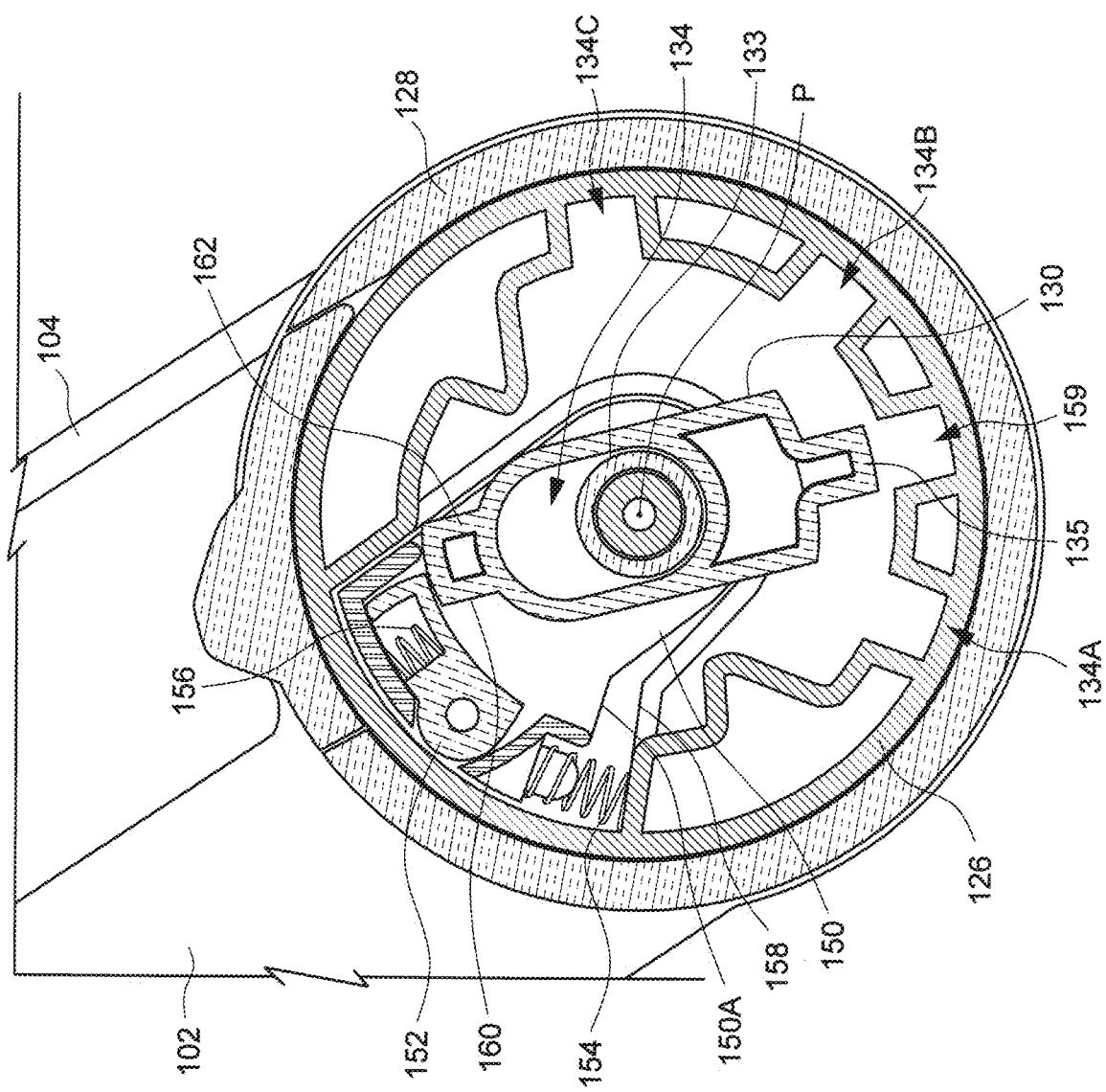

In order to further adjust rearward the carrying handle 104 from the safety position to the recline position, the caregiver has to depress again the release member 140 for unlocking the carrying handle 104. As shown in FIG. 16, the latch 130 accordingly slides in an unlocking direction and pushes against the impeding part 152, which in turn rotates relative to the coupling portion 126 and the carriage 150 from the first state to the second state for allowing a disengagement of the latch from the locking groove 159 of the coupling portion 126. While the impeding part 152 moves from the first state to the second state, the carriage 150 can remain in the first position. The latch 130 can thereby disengage from the locking groove 159 of the coupling portion 126 for allowing rotation of the carrying handle 104 away from the safety position.

Figure 17:
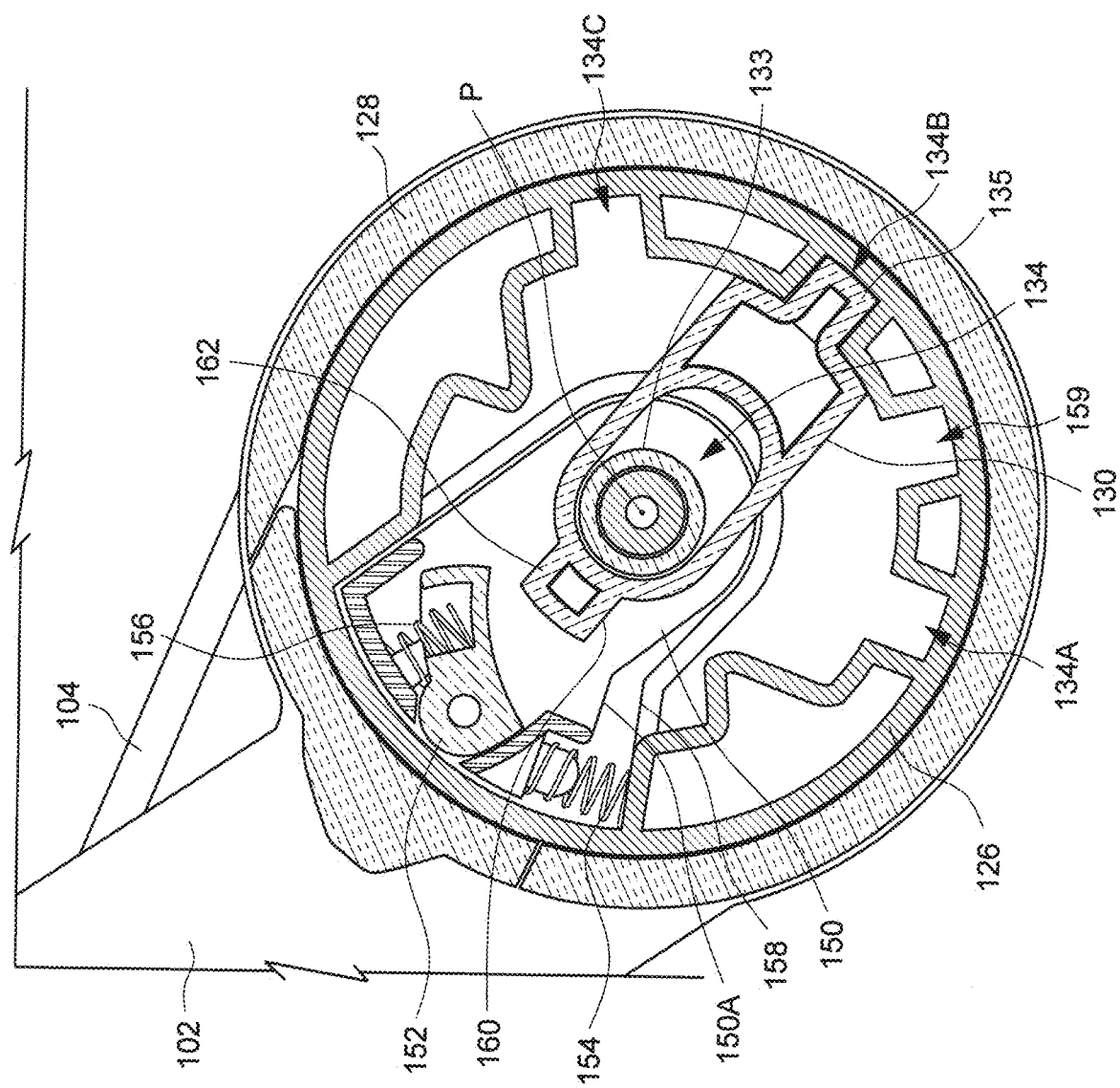

Next referring to FIG. 17, the unlocked carrying handle 104 then can be rotated rearward from the safety position to the recline position of FIG. 5. As the latch 130 rotates along with the carrying handle 104 away from the safety position, the impeding part 152 can recover the first state owing to the biasing action applied by the spring 156, whereas the carriage 150 remains in the first position. Once the carrying handle 104 reaches the recline position, the latch biasing spring 132 can urge the latch 130 to engage with the locking groove 134B of the coupling portion 126 for locking the carrying handle 104 in position.

In case the caregiver wants to rotate the carrying handle 104 from the recline position of FIG. 5 to the carry position of FIG. 2, the release member 140 can be depressed to disengage the latch 130 as previously described. Then the carrying handle 104 can be rotated forward past the safety position until it reaches and locks in the carry position. As the carrying handle 104 passes by the safety position, the protrusion 162 of the latch 130 can push against a ramp of the impeding part 152, which causes the impeding part 152 to rotate relative to the carriage 150 and the coupling portion 126 from the first state to the second state for allowing passage of the latch 130. Once the latch 130 has moved past the impeding part 152, the spring 156 can urge the impeding part 152 to recover the first state.

The safety mechanism 122 described above thus can prevent inadvertent rearward rotation of the carrying handle 104 from the carry position to the recline position, while conveniently allowing forward rotation of the carrying handle 104 from the recline position to the carry position without stopping in the safety position.

Figure 18:
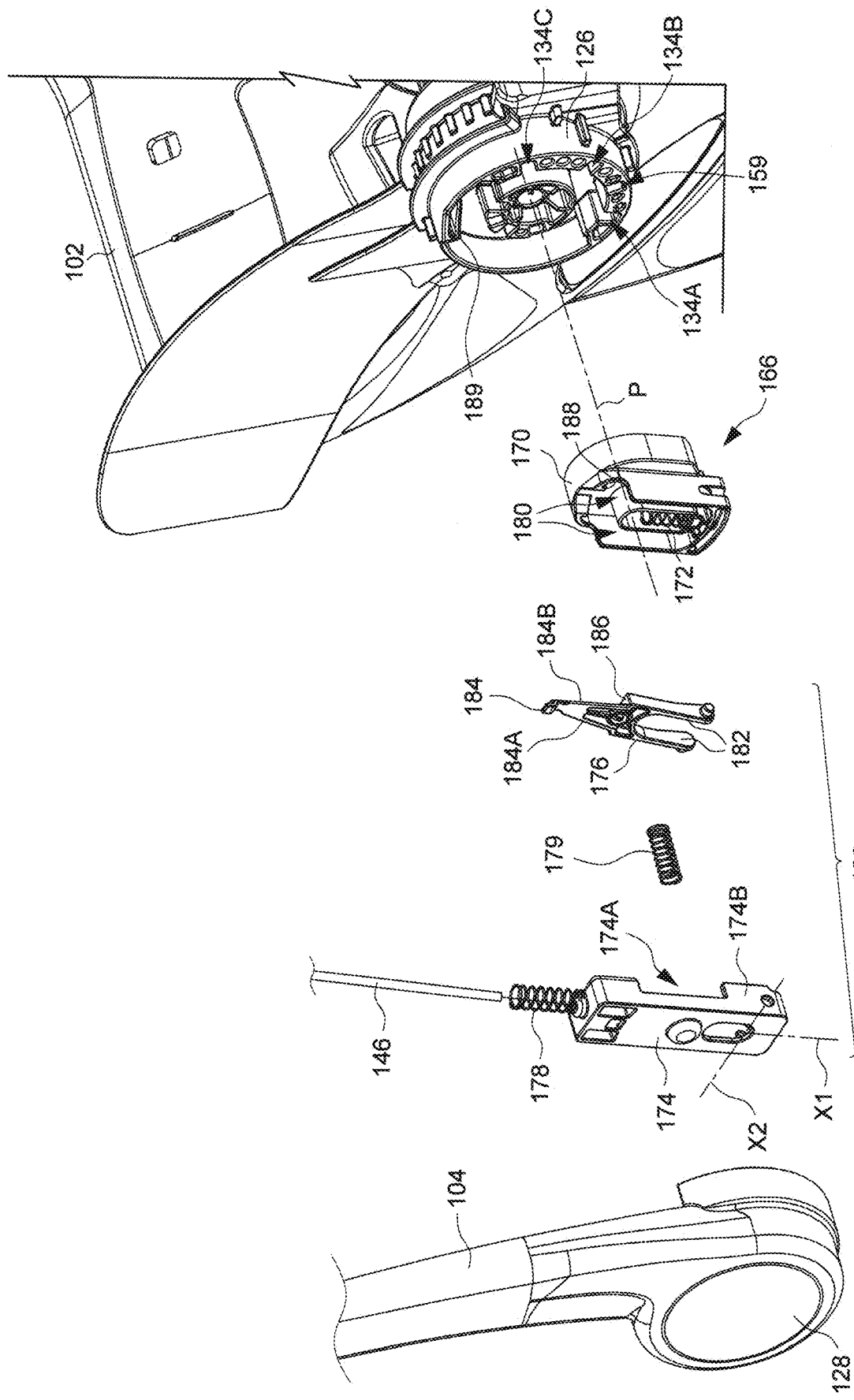

FIGS. 18 and 19 are schematic views illustrating another embodiment of a latching mechanism 166 and a safety mechanism 168 for preventing inadvertent rotation of the carrying handle 104 from the carry position to the recline position. The latching mechanism 166 include a latch 170 and a latch biasing spring 172 that are disposed in the inner cavity between the coupling portion 126 and the coupling shell 128. The latch 170 and the latch biasing spring 172 operate similar to the latch 130 and the latch biasing spring 132 described previously for locking the carrying handle 104 in the various angular positions. However, rather than directly anchoring with the cable 146, the latch 170 can be operatively connected with the cable 146 via the safety mechanism 168. The safety mechanism 168 is disposed in an inner cavity defined at least partially by the coupling portion 126 and the coupling shell 128, and can include a carriage 174, a catching part 176 and two springs 178 and 179.

Referring to FIGS. 18 and 19, the carriage 174 is anchored with one end of the cable 146, and is assembled in the coupling shell 128 for sliding movement relative to the coupling portion 126 of the seat body 102 and the carrying handle 104 along a sliding axis X1. The sliding axis X1 is supported by the carrying handle 104, and is substantially orthogonal to the pivot axis P of the carrying handle 104. In one embodiment, the carriage 174 can have an elongated shape having a cavity 174A that is defined at least partially between two sidewalls 174B. The carriage 174 can be assembled adjacent to the latch 170 with the two sidewalls 174B of the carriage 174 being guided for sliding movement in two guide slots 180 provided in the latch 170, thereby allowing relative sliding movement between the carriage 174 and the latch 170 along the sliding axis X1. In this manner, the carriage 174 can have two positions relative to the latch 170: a first position where it is coupled with the latch 170 via engagement of the catching part 176 (as better shown in FIG. 20), and a second position where it is decoupled from the latch 170 (as better shown in FIG. 23). When the carriage 174 is coupled with the latch 170 via the catching part 176, the carriage 174, the catching part 176 and the latch 170 can slide in unison along the sliding axis X1 for locking and unlocking the carrying handle 104. When the carriage 174 is decoupled from the latch 170, relative movement is allowed between the carriage 174 and the latch 170.

The spring 178 has two opposite ends respectively connected with the carriage 174 and an inner sidewall of the carrying handle 104. The spring 178 applies a biasing action on the carriage 174 in a direction opposite to the pulling action of the cable 146, such that the carriage 174 can be biased by the spring 178 to the first position.

The catching part 176 is pivotally connected with the carriage 174, and can rotate along with the carriage 174 and the latch 170 about the pivot axis P of the carrying handle 104. The catching part 176 can include two arms 182 and a stem 184. In some embodiments, the catching part 176 including the two arms 182 and the stem 184 may be formed integrally as a single body. The catching part 176 can be received at least partially in the cavity 174A of the carriage 174, with the two arms 182 respectively connected pivotally with the two sidewalls 174B of the carriage 174 about a pivot axis X2. The pivot axis X2 about which the catching part 176 is pivotally connected with the carriage 174 is substantially orthogonal to the sliding axis X1 of the carriage 174. With this assembly, the latch 170, the carriage 174 and the catching part 176 can be rotationally coupled with the carrying handle 104 during its rotation about the pivot axis P.

Referring to FIGS. 18 and 19, the stem 184 of the catching part 176 can have two ramped surfaces 184A and 184B at two opposite sides. Moreover, the catching part 176 can further have a driving surface 186 that is defined on a shoulder portion at a location adjacent to a junction between the stem 184 and the two arms 182. The catching part 176 can rotate relative to the carriage 174 between a first state where the driving surface 186 can engage with an interlock surface 188 provided on the latch 170, and a second state where the driving surface 186 can disengage from the interlock surface 188 of the latch 170.

The spring 179 can have two opposite ends respectively connected with the carriage 174 and the catching part 176. The spring 179 can exert a biasing force for rotationally urging the catching part 176 toward the first state.

Referring to FIG. 18, the coupling portion 126 can further include a protrusion 189 that is disposed radially apart from the pivot axis P of the carrying handle 104 and projects toward the coupling shell 128. As the carrying handle 104 rotates and approaches the safety position, the protrusion 189 of the coupling portion 126 can push against either of the ramped surface 184A and 184B of the stem 184 so that the catching part 176 is urged to switch from the first state to the second state for disengaging the driving surface 186 from the interlock surface 188 of the latch 170.

Figure 20:
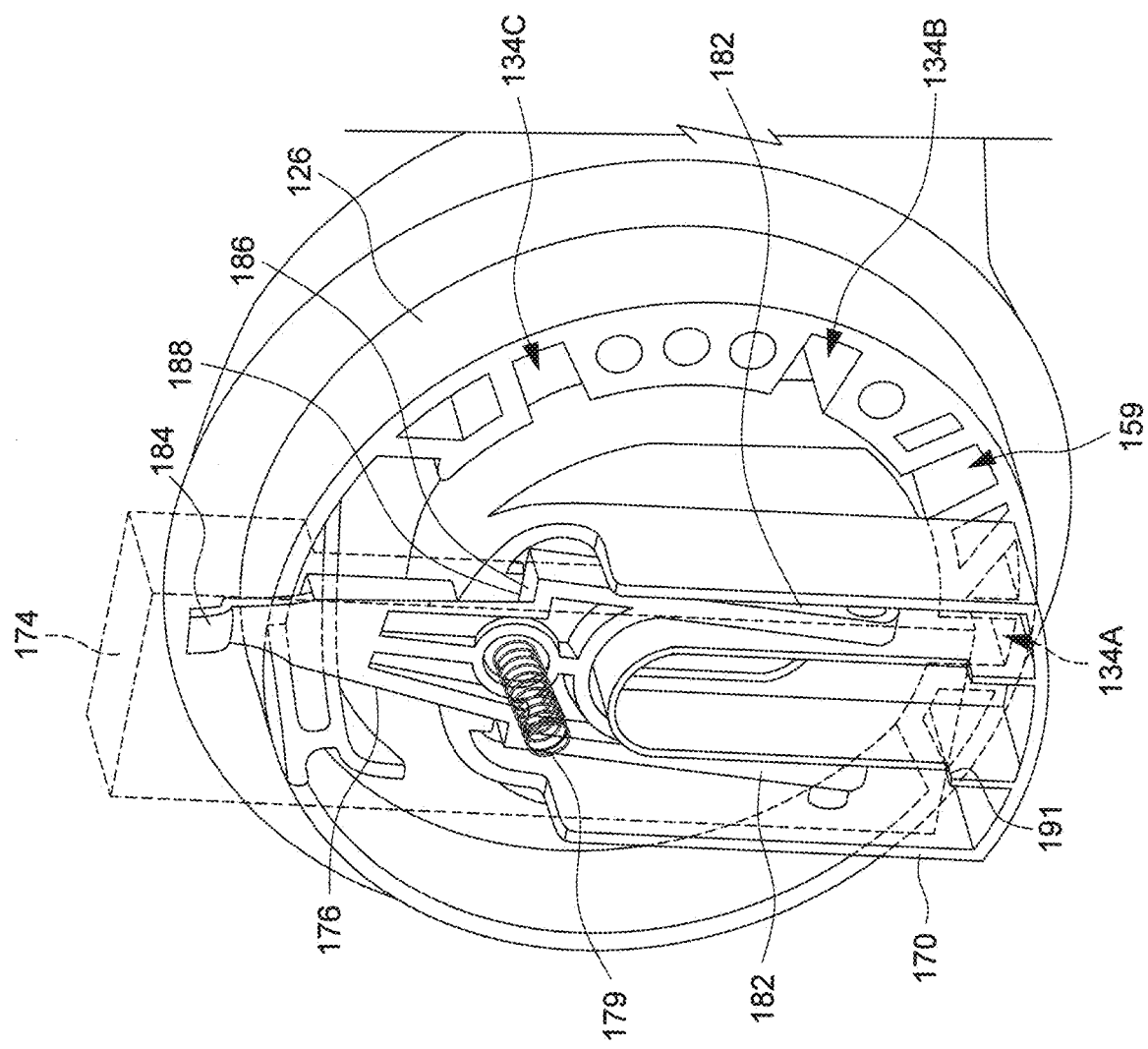
FIGS. 20-24 are schematic views illustrating exemplary operation of the latching mechanism and safety mechanism shown in FIGS. 18 and 19.

Like previously described, during adjustment of the carrying handle 104 from the carry position of FIG. 2 toward the recline position of FIG. 5, the safety mechanism 168 can interact with the latch 170 for forcing the carrying handle 104 to stop in the intermediate safety position of FIG. 7, such that the latch 170 can engage with the coupling portion 126 for locking the carrying handle 104 in the safety position. In conjunction with FIGS. 18 and 19, FIGS. 20-24 are schematic views illustrating exemplary operation of the latching mechanism 166 and the safety mechanism 168. For the sake of clarity, the carriage 174 is schematically represented with phantom lines in FIGS. 20-24. In FIG. 20, the latch 170 is shown as being engaged with the locking groove 134A of the coupling portion 126, such that the carrying handle 104 is locked in the carry position shown in FIG. 2. While the carrying handle 104 is locked in the carry position, the carriage 174 remains in the first position abutting a rib 191 of the latch 170 owing to the biasing action of the spring 178, and the catching part 176 is kept in the first state owing to the biasing action of the spring 179 so that the driving surface 186 can be positioned adjacent to the interlock surface 188 of the latch 170.

Figure 21:
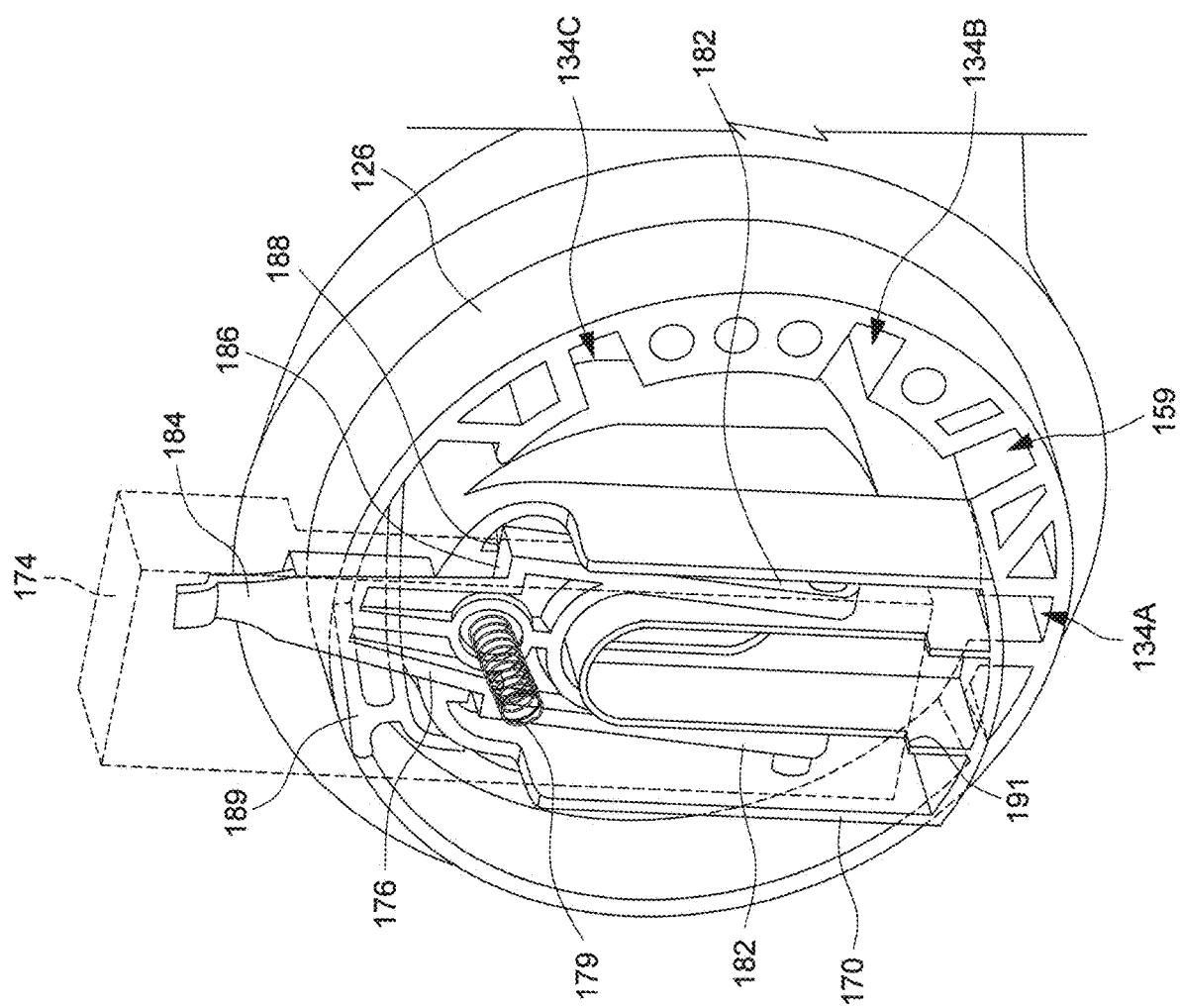

Suppose that the carrying handle 104 is to be adjusted rearward from the carry position of FIG. 2 to the recline position of FIG. 5. The caregiver can depress the release member 140 (better shown in FIGS. 10 and 11), which results in a pulling action applied through the cable 146 and causes the carriage 174 and the catching part 176 to slide upward in unison along the sliding axis X1. As a result, the driving surface 186 of the catching part 176 can push against the interlock surface 188 of the latch 170, and urge the latch 170 to move along with the carriage 174 and the catching part 176 to disengage from the locking groove 134A of the coupling portion 126 as shown in FIG. 21. The carrying handle 104 is thereby unlocked, and can be rotated rearward from the carry position toward the recline position.

Figure 22:
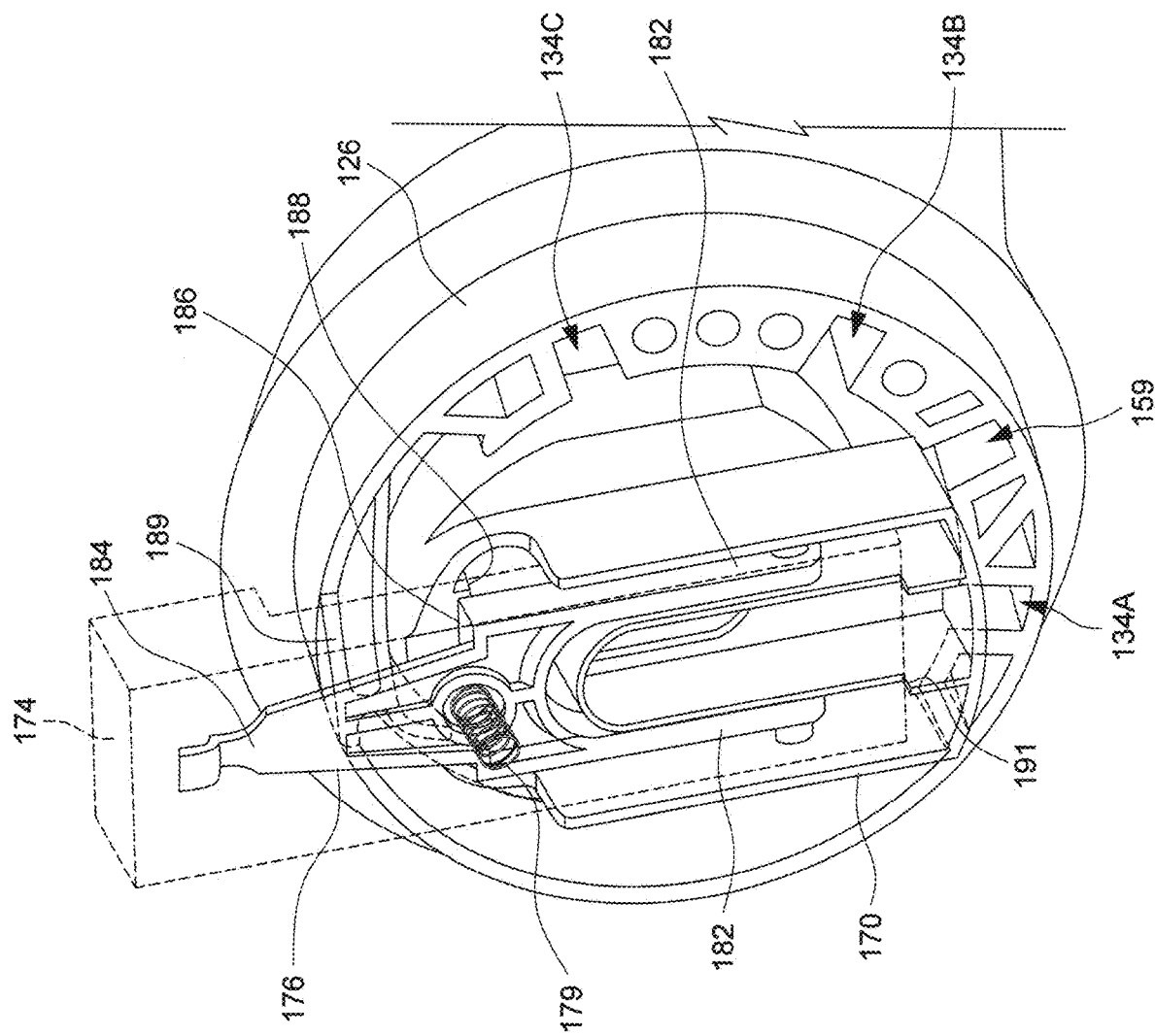
Figure 23:
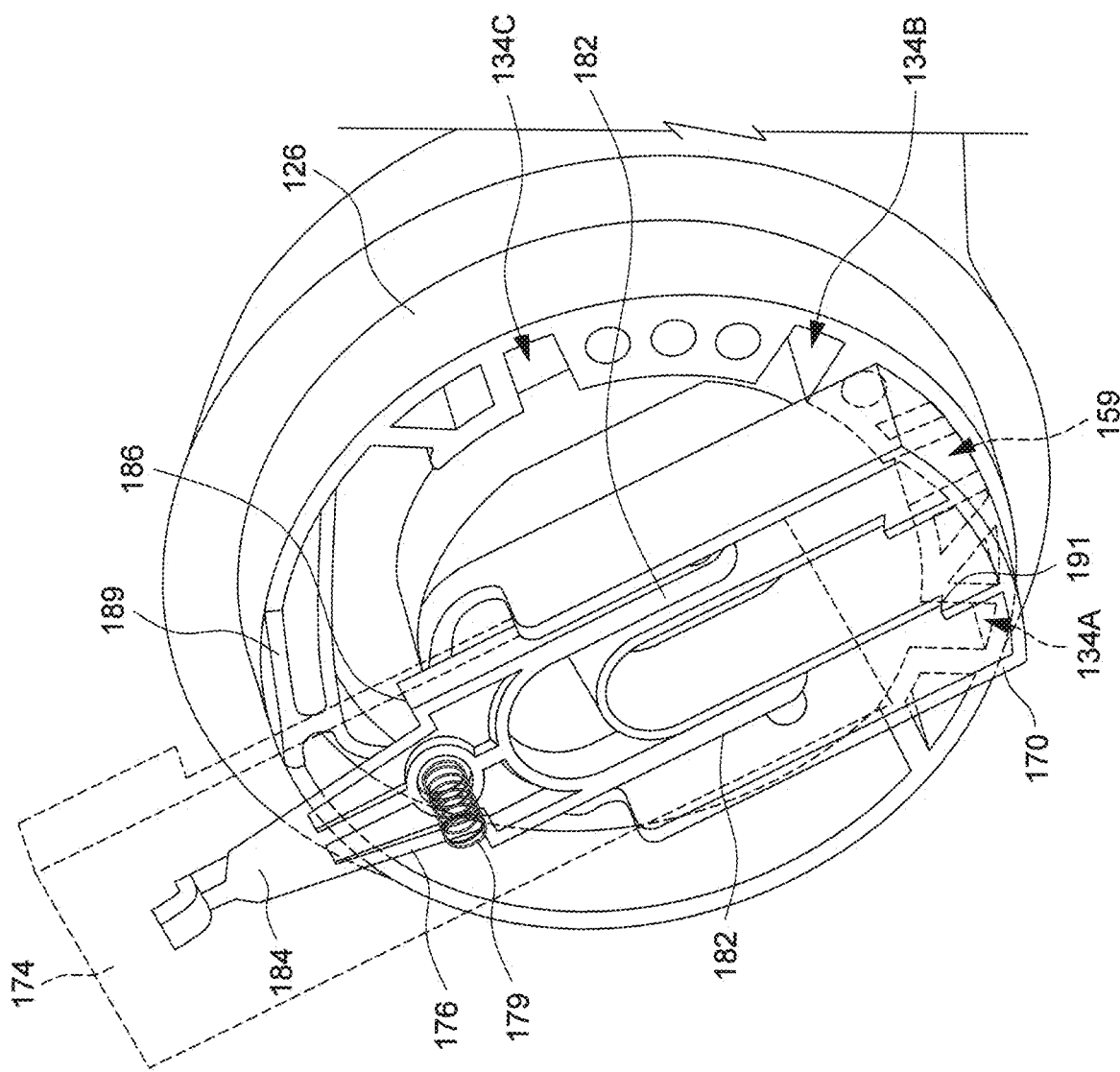

Referring to FIG. 22, as the carrying handle 104 rotating rearward approaches the safety position of FIG. 7, the protrusion 189 of the coupling portion 126 can push against the ramped surface 184A (better shown in FIGS. 18 and 19) of the stem 184 so that the catching part 176 rotates relative to the carriage 174 and switches from the first state to the second state for disengaging the driving surface 186 from the interlock surface 188 of the latch 170. Owing to the spring action applied by the latch biasing spring 172, the latch 170 then can slide relative to the carriage 174 and the catching part 176 past the driving surface 186 for engaging with the locking groove 159 of the coupling portion 126. As shown in FIG. 23, this locking engagement of the latch 170 can stop and lock the carrying handle 104 in the safety position. Once the latch 170 is engaged with the locking groove 159, the driving surface 186 of the catching part 176 is spaced apart from the interlock surface 188 of the latch 170, and the carriage 174 is in the second position disengaged from the latch 170 and away from the rib 191 thereof.

Figure 10:
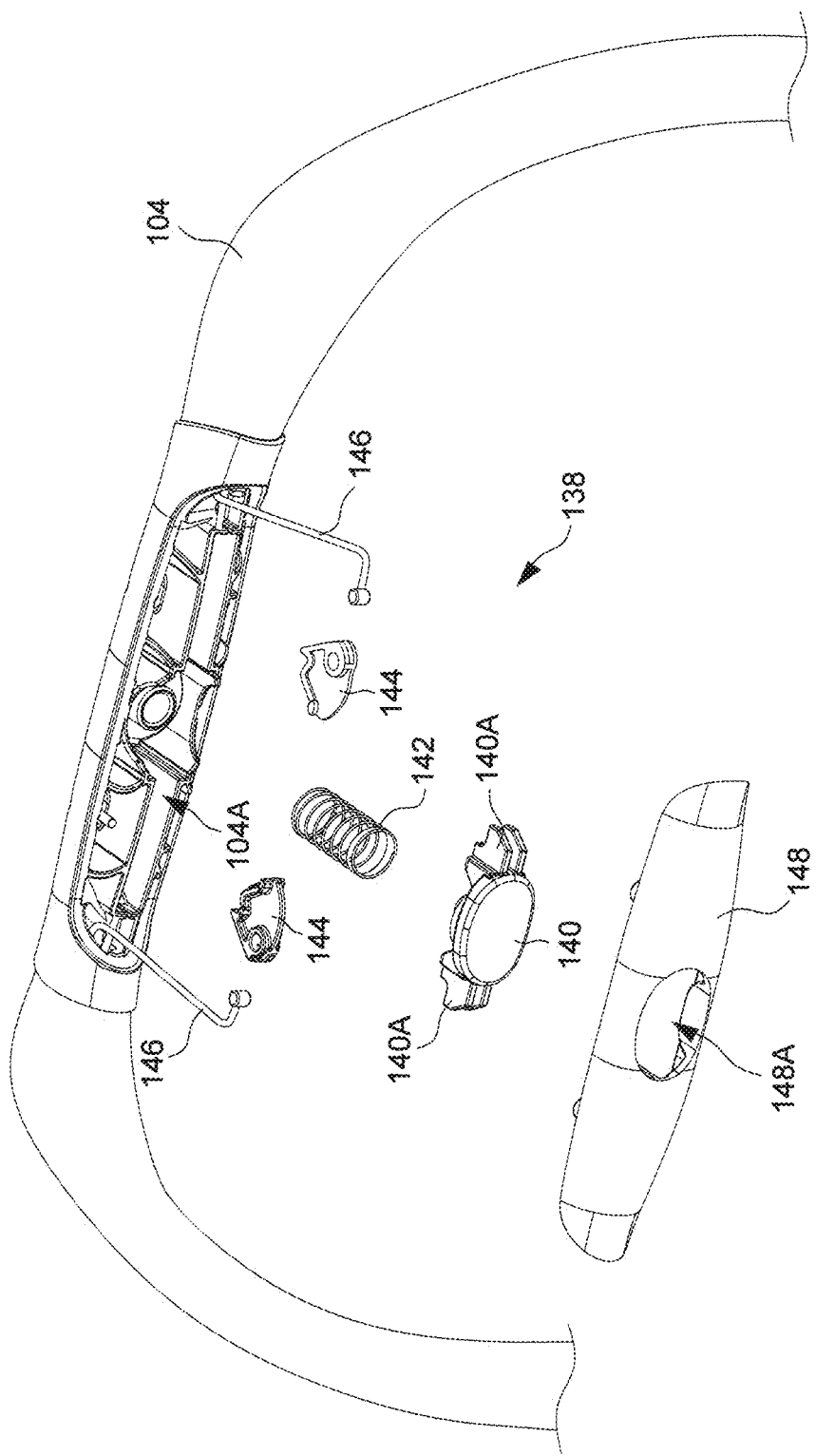
FIGS. 10 and 11 are respectively an exploded and a cross-sectional view illustrating a release mechanism that is operatively connected with the two latching mechanisms provided at the left and right sides of the carrying handle.
Figure 11:
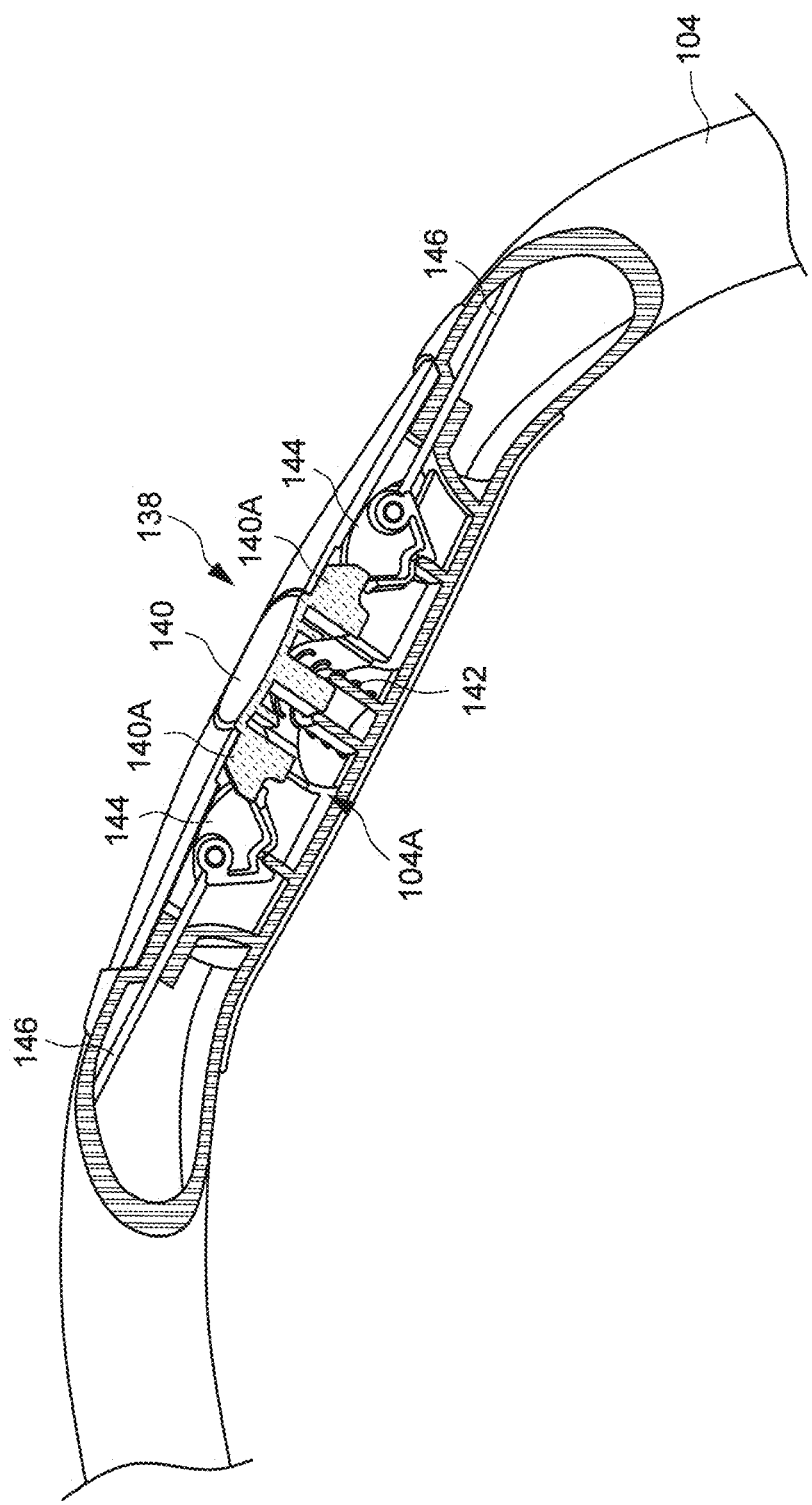
Figure 12:
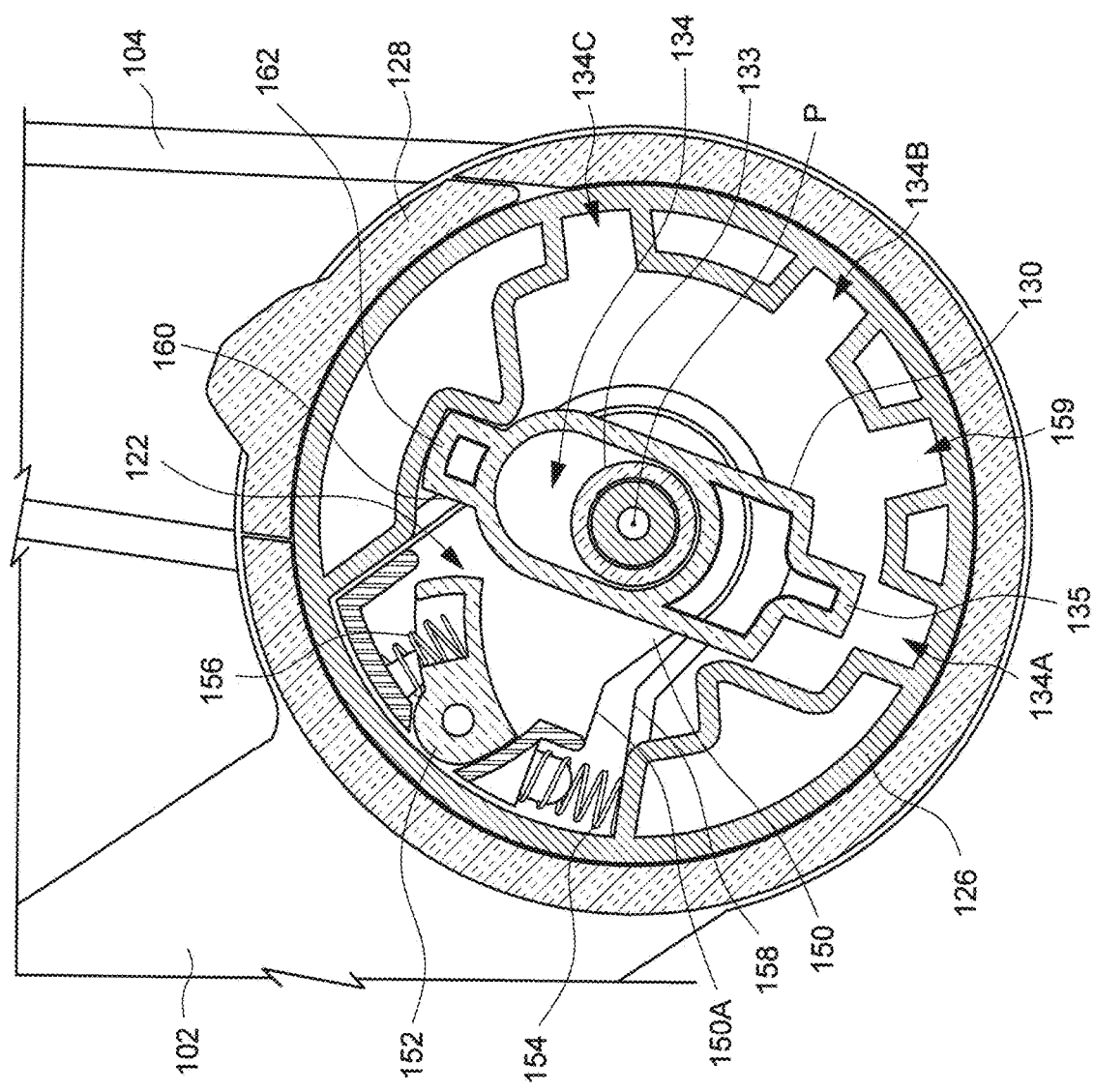
FIGS. 12-17 are schematic views illustrating exemplary operation of the latching mechanism and safety mechanism shown in FIGS. 8 and 9.
Figure 24:
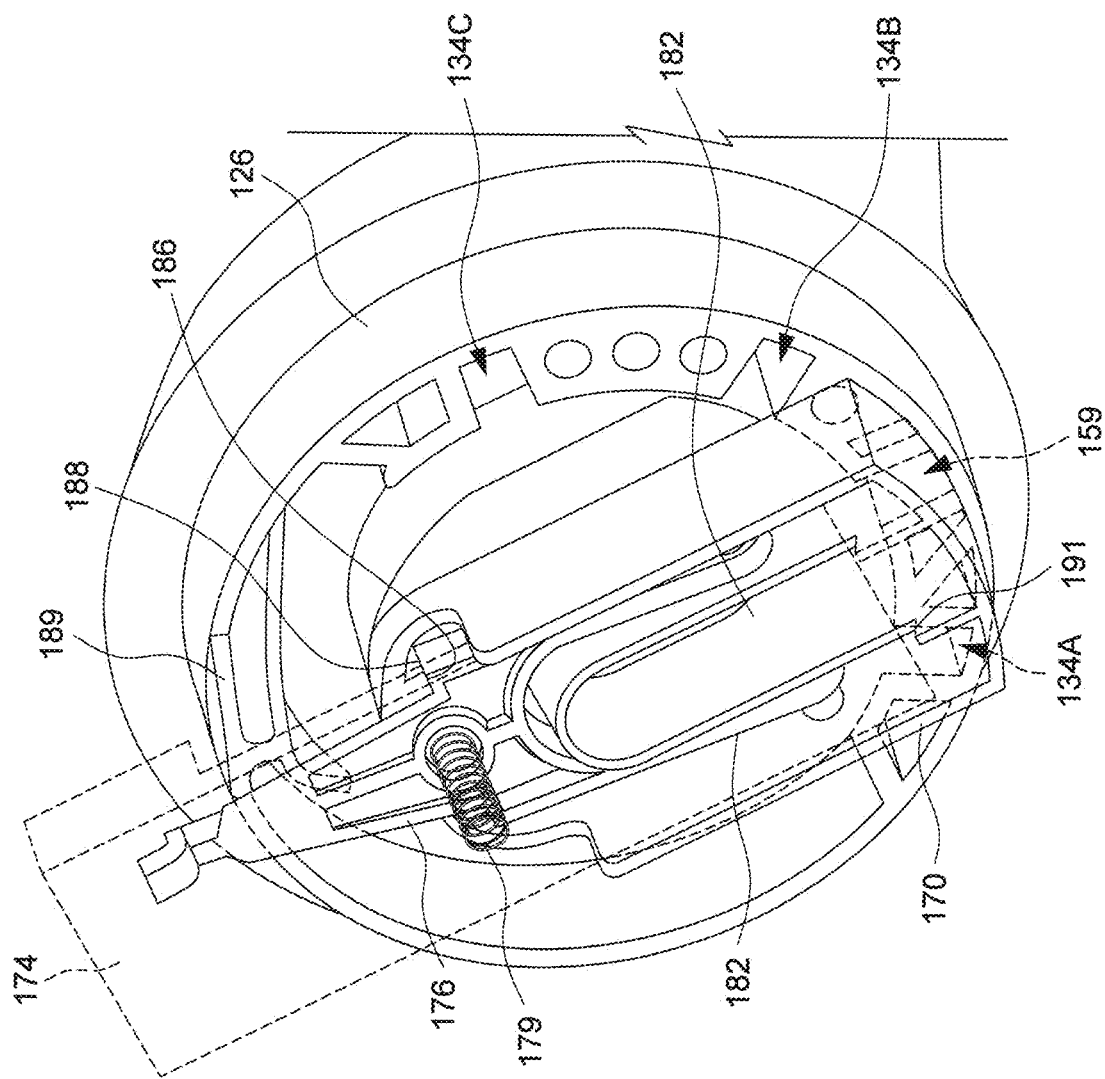

Next referring to FIG. 24, in order to further adjust rearward the carrying handle 104 from the safety position to the recline position, the caregiver has to release the pressing action exerted on the release member 140 (better shown in FIGS. 10 and 11). As a result, the carriage 174 biased by the spring 178 can move relative to the latch 170 from the second position to the first position abutting against the rib 191 of the latch 170, and the catching part 176 biased by the spring 179 can recover the first state for engagement of the driving surface 186 with the interlock surface 188 of the latch 170, the latch 170 remaining stationary and engaged with the locking groove 159. Then the release member 140 can be depressed again, which causes the carriage 174 and the catching part 176 to slide upward in unison and urge the latch 170 to disengage from the locking groove 159 of the coupling portion 126. The carrying handle 104 is thereby unlocked, and can be rotated rearward from the safety position to the recline position. Once the carrying handle 104 reaches the recline position, the latch 170 can engage with the locking groove 134B of the coupling portion 126 for locking the carrying handle 104 in position.

In case the caregiver wants to rotate the carrying handle 104 from the recline position of FIG. 5 to the carry position of FIG. 2, the release member 140 can be depressed to disengage the latch 170 from the coupling portion 126 like previously described. As the carrying handle 104 rotates forward and approaches the safety position, the safety mechanism 168 can operate like previously described so that the latch 170 automatically engages with the locking groove 159 of the coupling portion 126 for locking the carrying handle 104 in the safety position. Then the caregiver can depress again the release member 140 to unlock the carrying handle 104, and further rotate the carrying handle 104 from the safety position to the carry position.

Advantages of the infant carriers described herein include a safety mechanism that can automatically stop the carrying handle in a safety position so as to prevent inadvertent rotation of the carrying handle to certain angular position of concern. Moreover, the infant carriers can include a shock-absorbing cushion for dissipating impact energy occurring during collision with a side of the infant carrier, which can make it safer in use.

Realizations of the infant carrier have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant carrier comprising:
    a seat body for receiving a child, a side of the seat body having a coupling portion;
    a carrying handle having a coupling shell pivotally connected with the coupling portion of the seat body, the carrying handle being adjustable to a plurality of angular positions relative to the seat body, the angular positions including a first angular position and a second angular position;
    a latch assembled in the coupling shell of the carrying handle, the latch being movable relative to the coupling shell to engage with the coupling portion for blocking rotation of the carrying handle or to disengage from the coupling portion for allowing rotation of the carrying handle;
    a latch biasing spring connected with the latch, the latch biasing spring urging the latch for engagement with the coupling portion;
    a release member assembled with the carrying handle and operatively connected with a cable;
    a carriage anchored with one end of the cable and disposed adjacent to the latch; and
    a catching part connected with the carriage, the catching part being movable relative to the carriage between a first and a second state, the carriage and the catching part in the first state being movable in unison upon actuation of the release member so that the catching part engages with the latch and urges the latch to disengage from the coupling portion, and the catching part when in the second state being disengaged from the latch so that the latch is movable relative to the carriage and the catching part for engagement with the coupling portion;
    wherein a rotation of the carrying handle from the first angular position toward the second angular position causes the coupling portion to push the catching part so that the catching part switches from the first state to the second state for disengaging from the latch, thereby the latch moves to engage with the coupling portion for forcing the carrying handle to stop in an intermediate safety position between the first and second angular positions.

2. The infant carrier according to claim 1, wherein the catching part has a driving surface, the carriage and the catching part in the first state being movable in unison upon actuation of the release member so that the driving surface engages with the latch and urges the latch to disengage from the coupling portion, and the driving surface being disengaged from the latch when the catching part is in the second state such that the latch is movable past the driving surface for engagement with the coupling portion.

3. The infant carrier according to claim 1, wherein the catching part is pivotally connected with the carriage.

4. The infant carrier according to claim 3, wherein the carriage and the catching part move in unison along a first axis upon actuation of the release member, and the catching part is pivotally connected with the carriage about a second axis that is substantially orthogonal to the first axis.

5. The infant carrier according to claim 1, further including a spring connected with the catching part for biasing the catching part to the first state.

6. The infant carrier according to claim 1, wherein the catching part has a ramped surface and the coupling portion has a protrusion, a rotation of the carrying handle from the first angular position toward the second angular position causing the protrusion of the coupling portion to push against the ramped surface and thereby urging the catching part to switch from the first state to the second state.

7. The infant carrier according to claim 1, wherein the carriage is movable relative to the latch between a first position where the carriage is coupled with the latch via engagement of the catching part, and a second position where the carriage and the catching part are decoupled from the latch, the carriage being connected with a spring that biases the carriage to the first position.

8. The infant carrier according to claim 1, wherein the catching part is received at least partially in a cavity provided in the carriage.

9. The infant carrier according to claim 1, wherein the first angular position is a carry position of the carrying handle, and the second angular position is a recline position of the carrying handle.

10. An infant carrier comprising:
    a seat body for receiving a child, a side of the seat body having a coupling portion;
    a carrying handle having a coupling shell pivotally connected with the coupling portion of the seat body, the carrying handle being adjustable to a plurality of angular positions relative to the seat body, the angular positions including a first angular position and a second angular position;
    a latch assembled in the coupling shell of the carrying handle, the latch being movable relative to the coupling shell to engage with the coupling portion for blocking rotation of the carrying handle or to disengage from the coupling portion for rotation of the carrying handle;
    a latch biasing spring connected with the latch, the latch biasing spring urging the latch for engagement with the coupling portion;
    a release member assembled with the carrying handle and operatively connected with a cable; and
    a carriage connected with a catching part and anchored with one end of the cable, wherein the carriage has a first and a second position relative to the latch, the carriage being coupled with the latch via engagement of the catching part in the first position, and the carriage being decoupled from the latch in the second position;
    wherein a rotation of the carrying handle from the first angular position toward the second angular position with the carriage in the first position causes the coupling portion to push against the catching part so that the catching part disengages from the latch for decoupling the carriage from the latch, thereby the latch moves relative to the carriage to engage with the coupling portion for forcing the carrying handle to stop in an intermediate safety position between the first and second angular positions.

11. The infant carrier according to claim 10, wherein the catching part is movable relative to the carriage between a first and a second state, the carriage and the catching part in the first state being movable in unison upon actuation of the release member so that the catching part engages with the latch and urges the latch to disengage from the coupling portion, and the catching part when in the second state being disengaged from the latch so that the latch is movable relative to the carriage and the catching part for engagement with the coupling portion.

12. The infant carrier according to claim 11, wherein a rotation of the carrying handle from the first angular position toward the second angular position causes the coupling portion to push the catching part so that the catching part switches from the first state to the second state for disengaging from the latch, thereby the latch moves relative to the carriage and the catching part to engage with the coupling portion for forcing the carrying handle to stop in an intermediate safety position between the first and second angular positions.

13. The infant carrier according to claim 11, wherein the catching part has a ramped surface and the coupling portion has a protrusion, a rotation of the carrying handle from the first angular position toward the second angular position causing the protrusion of the coupling portion to push against the ramped surface and thereby urging the catching part to switch from the first state to the second state.

14. The infant carrier according to claim 11, wherein the catching part has a driving surface, the carriage and the catching part in the first state being movable in unison upon actuation of the release member so that the driving surface engages with the latch and urges the latch to disengage from the coupling portion, and the driving surface to being disengaged from the latch when the catching part is in the second state such that the latch is movable past the driving surface for engagement with the coupling portion.

15. The infant carrier according to claim 11, further including a spring connected with the catching part for biasing the catching part to the first state.

16. The infant carrier according to claim 10, wherein the catching part is pivotally connected with the carriage.

17. The infant carrier according to claim 16, wherein the carriage and the catching part move in unison along a first axis upon actuation of the release member, and the catching part is pivotally connected with the carriage about a second axis that is substantially orthogonal to the first axis.

18. The infant carrier according to claim 10, wherein the carriage is connected with a spring that biases the carriage to the first position.

19. The infant carrier according to claim 10, wherein the catching part is received at least partially in a cavity provided in the carriage.

20. The infant carrier according to claim 10, wherein the first angular position is a carry position of the carrying handle, and the second angular position is a recline position of the carrying handle.

* * * * *